United States Patent [19]

Dannheim et al.

[11] Patent Number: 5,280,110
[45] Date of Patent: Jan. 18, 1994

[54] REACTIVE DYES WHICH CONTAIN A TRIAZINYL GROUP LINKED TO A SUBSTITUTED ALKYL GROUP AND AN AMINO GROUP WHICH CONTAINS A VINYLSULFONE-TYPE REACTIVE RADICAL

[75] Inventors: Jörg Dannheim; Andreas v.d. Eltz, both of Frankfurt am Main, Fed. Rep. of Germany

[73] Assignee: Hoechst Aktiengesellschaft, Frankfurt am Main, Fed. Rep. of Germany

[21] Appl. No.: 992,585

[22] Filed: Dec. 18, 1992

[30] Foreign Application Priority Data

Dec. 20, 1991 [DE] Fed. Rep. of Germany ....... 4142377
Jan. 16, 1992 [DE] Fed. Rep. of Germany ....... 4200932

[51] Int. Cl.$^5$ ..................... C09B 62/503; D06P 1/384
[52] U.S. Cl. ..................... 534/618; 534/617; 534/629; 534/641; 534/642; 540/126; 544/76; 544/189; 544/193.1; 544/206; 544/207; 544/211; 544/217
[58] Field of Search ............... 534/617, 618, 629, 641, 534/642; 540/126; 544/76, 193.1, 189, 206, 207

[56] References Cited

U.S. PATENT DOCUMENTS 3,205,218 9/1965 Arbuckle ..................... 534/617 X
4,740,592 4/1988 Springer et al. ............. 534/617 X

FOREIGN PATENT DOCUMENTS

90/13604 11/1990 World Int. Prop. O. ......... 534/617

Primary Examiner—Mary C. Lee
Assistant Examiner—Fiona T. Powers
Attorney, Agent, or Firm—Connolly & Hutz

[57] ABSTRACT

Water-soluble dyes, such as, for example, azo dyes, heavy metal complex azo dyes, anthraquinone, phthalocyanine and formazan dyes containing the group of the formula

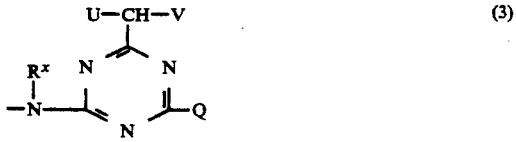

are described, in which R$^x$ is hydrogen or substituted or unsubstituted lower alkyl, U is hydrogen, cyano, lower alkanoyl, lower alkoxycarbonyl, nitro, lower alkylsulfonyl or substituted or unsubstituted arylsulfonyl, V is cyano, lower alkoxycarbonyl, substituted or unsubstituted aryloxycarbonyl, carboxy, lower alkylaminocarbonyl, substituted or unsubstituted arylaminocarbonyl, lower alkylcarbonyl, substituted or unsubstituted arylcarbonyl or arylsulfonyl, aminocarbonyl, dialkylaminocarbonyl, trifluoromethyl, nitro or lower alkylsulfonyl and Q is an amino group which is mono- or disubstituted by the radical —W—(SO$_2$—Y)$_z$, in which W is an arylene or alkylene radical or a combination of such radicals, the alkylene radicals being those having 1 to 8 carbon atoms, and it being possible for them to be substituted, and the arylene radicals being substituted or unsubstituted phenylene or napthylene radicals, it being possible for the alkylene radicals to be interrupted by one or more hetero groups and for the alkylene and arylene moieties in the combined alkylene/arylene radicals to be separated from one another by a hetero group, the radical —SO$_2$—Y is a fiber-reactive group from the vinylsulfone series and z is a number 1 or 2, or Q is an nitrogen-containing radical which is bound to the triazine radical via the nitrogen atom and contains a fiber-reactive group from the vinylsulfone series bound via a lower alkylene radical. The dyes are suitable for dyeing hydroxy and/or carboxamido-containing material, in particular fiber material.

11 Claims, No Drawings

REACTIVE DYES WHICH CONTAIN A TRIAZINYL GROUP LINKED TO A SUBSTITUTED ALKYL GROUP AND AN AMINO GROUP WHICH CONTAINS A VINYLSULFONE-TYPE REACTIVE RADICAL

The invention is in the technical field of fiber-reactive dyes.

The practice of dyeing with reactive dyes has recently led to increased demands on the quality of the dyeings and the economy of the dyeing process. Accordingly, there is still a need for new fiber-reactive dyes exhibiting improved properties, in particular in terms of practical application. Thus, fiber-reactive dyes containing an s-triazine radical to which a fiber-reactive group from the vinylsulfonic series is bound and whose third substituent is a substituted or unsubstituted amino group or a methoxy group are disclosed in U.S. Pat. No. 4,740,592 and in Japanese laid-open patent publications sho-40-17113 and sho-50-31566. Furthermore, dyes having a triazine radical which contains malonic diester, malononitrile monoester and acetylacetone radicals are disclosed in U.S. Pat. No. 3,205,218. However, the known dyes have certain deficiencies in practical application; thus, they exhibit a degree of fixation which, in today's view, is no longer fully satisfactory and they produce dyeings showing insufficient color strength.

Using the present invention, new, water soluble, improved dyes have now been found, which have the formula (1) below.

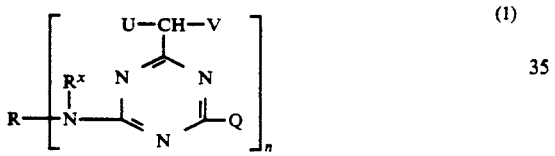

In formula (1),

F is the radical of a monoazo, disazo or polyazo dye or of a heavy metal complex azo dye derived therefrom, or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye;

$R^x$ is a hydrogen atom or an alkyl group of 1 to 4 carbon atoms, such as a methyl or ethyl group, which can be substituted by halogen, such as chlorine and bromine, hydroxy, cyano, alkoxy of 1 to 4 carbon atoms, such as methoxy and ethoxy, alkoxycarbonyl of 2 to 5 carbon atoms, carboxy, sulfamoyl, sulfo or sulfato, preferably a methyl or ethyl group and in particular a hydrogen atom;

n is the number 1 or 2, preferably 1;

U is a hydrogen atom, a cyano group, an alkanoyl group of 2 to 5 carbon atoms, such as the propionyl group and in particular the acetyl group, or an alkoxycarbonyl group of 2 to 5 carbon atoms, such as the ethoxycarbonyl or methoxycarbonyl group, or is a nitro group, an alkylsulfonyl group having an alkyl radical of 1 to 4 carbon atoms, or an arylsulfonyl group, it being possible for the aryl group to be substituted, such as, for example, by 1 or 2 substituents from the group comprising carboxy, sulfo, methyl, ethyl, methoxy and ethoxy, for example a phenylsulfonyl group which can be substituted in the phenyl radical by the substituents mentioned, and is preferably a hydrogen atom or an acetyl, ethoxycarbonyl or methoxycarbonyl group and particularly preferably a hydrogen atom;

V is a cyano group or an alkoxycarbonyl group of 2 to 5 carbon atoms, such as the methoxycarbonyl or ethoxycarbonyl group, an aryloxycarbonyl group, whose aryl radical can be substituted, such as, for example, by 1 or 2 substituents from the group comprising sulfo, carboxy, methyl, ethyl, methoxy and ethoxy, for example a phenoxycarbonyl group which can be substituted by 1 or 2 of the substituents mentioned, or is a carboxy group, an alkylaminocarbonyl group having an alkyl radical of 1 to 4 carbon atoms, an arylaminocarbonyl group, it being possible for the aryl radical to be substituted, such as by the abovementioned substituents, such as, for example, a phenylaminocarbonyl radical which can be substituted by the abovementioned substituents, or is an alkylcarbonyl group of 2 to 5 carbon atoms, such as an acetyl group, or is an arylcarbonyl group, such as a phenylcarbonyl group, or is an arylsulfonyl group, such as a phenylsulfonyl group, it also being possible here for the aryl radicals in these groups to be substituted by one or two of the abovementioned substituents, or is an aminocarbonyl group or an N,N-dialkylaminocarbonyl group containing alkyl radicals each having 1 to 4 carbon atoms, or is a trifluoromethyl or nitro or an alkylsulfonyl group of 1 to 4 carbon atoms in the alkyl radical, and is preferably a cyano group, an acetyl group, a methoxycarbonyl group and an ethoxycarbonyl group and particularly preferably an ethoxycarbonyl and a methoxycarbonyl group;

Q is a group of the formula (2a) or (2b)

in which $R^z$ is a hydrogen atom or an alkyl group of 1 to 6 carbon atoms, preferably of 1 to 4 carbon atoms, such as, in particular, a methyl or ethyl group, which can be substituted by 1 or 2 substituents from the group comprising halogen, such as chlorine or bromine, hydroxy, cyano, alkoxy of 1 to 4 carbon atoms, such as methoxy and ethoxy, carboxy, carbalkoxy of 2 to 5 carbon atoms, phenoxycarbonyl, alkanoyl of 2 to 5 carbon atoms, benzoyl, sulfobenzoyl, sulfamoyl, sulfo and sulfato and/or by a phenyl radical which is unsubstituted or substituted by substituents from the group comprising halogen, such as chlorine and bromine, alkoxy of 1 to 4 carbon atoms, such as methoxy and ethoxy, alkyl of 1 to 4 carbon atoms, such as methyl, sulfo and carboxy, or is a cycloalkyl radical of 5 to 8 carbon atoms, such as a cyclopentyl, cyclohexyl or dimethyl cyclohexyl radical or a phenyl radical which is unsubstituted or substituted by substituents from the group comprising halogen, such as chlorine and bromine, alkoxy of 1 to 4 carbon atoms, such as methoxy and ethoxy, alkyl of 1 to 4 carbon atoms, such as methyl, sulfo and carboxy, W is an arylene, alkylene, alkylenearylene, arylenealkylene, alkylenearylenealkylene or arylenealkylenearylene radical, the alkylene radicals being those having 1 to 8, preferably 2 to 6, in particular 2 to 4, carbon atoms and it being possible for them to be substituted and the arylene radicals being substituted or unsubstituted phenylene or naphthylene radicals and, it being possible for the alkylene radicals to be interrupted by 1 or more, such as 2 or 3, hetero groups, such as —NH—, —N(R)— where R is alkyl of 1 to 4 carbon atoms, which can be substituted by sulfo, carboxy, sulfato, phenyl or sulfophenyl, —O—, —S—, —SO$_2$—, —CO—, —SO$_2$—NH—, —NH—SO$_2$—, —NH—CO— and —CO—NH—, and it being possible for the alkylene and arylene moieties in the combined alkylene-/arylene radicals to be separated from one another by a hetero group, such as, for example, one of the groups described above, Y is a vinyl group or an ethyl group containing, in the $\beta$-position, a substituent which can be eliminated by alkali, such as a $\beta$-sulfatoethyl, $\beta$-thiosulfatoethyl or $\beta$-phosphatoethyl group or a $\beta$-alkanoyloxyethyl group having 2 to 5 carbon atoms in the alkanoyl radical, such as a $\beta$-acetyloxyethyl group, or a $\beta$-benzoyloxyethyl, $\beta$-(sulfobenzoyloxy)ethyl or a $\beta$-(p-toluenesulfonyloxy)ethyl group or a $\beta$-haloethyl group, such as a $\beta$-bromoethyl or $\beta$-chloroethyl group, preferably a vinyl group and in particular a $\beta$-sulfatoethyl group, z is the number 1 or 2, A is the number zero or 1, and B is the number 1 or 2, the sum of (A+B) being the number 2, it being possible for the groups of the formula —W—(SO$_2$—Y)$_z$, in the case where B is 2, to have meanings which are identical to or different from one another;

X together with the nitrogen atom forms the divalent radical of a heterocyclic ring composed of 1 or 2 alkyl groups of 1 to 5 carbon atoms and optionally or 2 heterogroups, such as nitrogen and oxygen atoms and a group —NH—, such as, for example, a piperazin-1,4-ylene or a piperidinyl radical, and alk is an alkylene radical of 1 to 4 carbon atoms, preferably of 2 or 3 carbon atoms, such as an ethylene or n-propylene radical.

Preferably, F is the radical of a mono- or disazo dye or the radical of a metal complex azo dye, such as of a 1:1 copper complex o,o'-monoazo or -disazo dye, or of a triphendioxazine, anthraquinone or phthalocyanine dye, such as of a copper phthalocyanine dye.

The radical F can contain, in its basic structure, the substituents customary for organic dyes. Examples of such substituents are: alkyl groups of 1 to 4 carbon atoms, such as methyl, ethyl, propyl, isopropyl or butyl, of these preferably ethyl and in particular methyl; alkoxy groups of 1 to 4 carbon atoms, such as methoxy, ethoxy, propoxy, isopropoxy and butoxy, of these preferably ethoxy and in particular methoxy; acylamino groups of 2 to 8 carbon atoms, such as an acetylamino, propionylamino or benzoylamino group; primary and mono- or disubstituted amino groups, examples of substituents being alkyl groups of 1 to 4 carbon atoms and-/or phenyl groups, such as monoalkylamino and dialkylamino groups having 1 to 4 carbon atoms in the alkyl radical, phenylamino or N-(C$_1$-C$_4$-alkyl)-N-phenylamino groups, it being possible for the alkyl radicals to be additionally substituted, for example by phenyl, sulfophenyl, hydroxy, sulfato, sulfo and carboxy, and for the phenyl groups to be additionally substituted, such as by chlorine, sulfo, carboxy, methyl and/or methoxy, thus for example methylamino, ethylamino, propylamino, isopropylamino, butylamino, N,N-di-($\beta$-hydroxyethyl)amino, N,N-di-($\beta$-sulfatoethyl)amino, sulfobenzylamino, N,N-di-(sulfobenzyl)amino and diethylamino groups and phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl of 1 to 4 carbon atoms, it being possible for the alkyl radicals to be substituted in turn, for example by hydroxy, sulfato, sulfo, carboxy, phenyl and sulfophenyl, such as, for example, N-methylcarbamoyl and N-ethylcarbamoyl; sulfamoyl groups, which can be mono- or disubstituted by alkyl groups of 1 to 4 carbon atoms, and N-phenyl-N-alkylsulfamoyl groups having an alkyl group of 1 to 4 carbon atoms, it being possible for these alkyl groups to be substituted in turn by hydroxy, sulfato, sulfo, carboxy, phenyl and sulfophenyl, such as, for example, N-methylsulfamoyl, N-ethylsulfamoyl, N-propylsulfamoyl, N-isopropylsulfamoyl, N-butylsulfamoyl, N-($\beta$-hydroxyethyl)sulfamoyl and N,N-di-($\beta$-hydroxyethyl)sulfamoyl; N-phenylsulfamoyl, ureido, hydroxy, carboxy, sulfomethyl and sulfo groups; radicals of the formula —SO$_2$—Y where Y has the above meaning, such as $\beta$-sulfatoethylsulfonyl, $\beta$-thiosulfatoethylsulfonyl, $\beta$-phosphatoethylsulfonyl, $\beta$-acetyloxyethylsulfonyl, $\beta$-chloroethylsulfonyl and vinylsulfonyl groups.

The dye radical F is preferably substituted by one or more, such as 2 to 6, sulfo groups, and it can furthermore preferably contain substituents selected from the group comprising methyl, ethyl, methoxy, ethoxy, alkanoylamino of 2 to 5 carbon atoms, such as acetylamino, benzoylamino, amino, chlorine, bromine, ureido, hydroxyl, carboxy and sulfomethyl.

In all of the above formulae, the individual formula members, not only those designated by different symbols but also those designated by the same symbol within a formula, can, within the scope of their meaning, have meanings which are identical to or different from one another.

The groups "sulfo", "carboxy", "phosphato", "thiosulfato" and "sulfato" not only include their acid form but also their salt form. Accordingly, sulfo groups are groups of the formula —SO$_3$M, carboxy groups of the formula —COOM, phosphato groups of the formula —OPO$_3$M$_2$, thiosulfato groups of the formula —S—SO$_3$M and sulfato groups of the formula —OSO$_3$M, in which M is a hydrogen atom or a salt-forming metal atom, such as an alkali metal, such as sodium, potassium or lithium.

Examples of formula radicals R$^x$ are: hydrogen, methyl, ethyl, propyl, isopropyl, butyl, isobutyl, sec.-butyl, tert.-butyl, carboxymethyl, $\beta$-carboxyethyl, $\beta$-carboxypropyl, methoxycarbonylmethyl, ethoxycarbonylmethyl, β-methoxyethyl, β-ethoxyethyl, β-methoxypropyl, β-chloroethyl, β-bromopropyl, β-hydroxyethyl, β-hydroxybutyl, β-cyanoethyl, sulfomethyl, β-sulfoethyl, amidosulfonylmethyl and β-sulfatoethyl.

Examples of formula radicals $R^z$ are: hydrogen, methyl, ethyl, carboxymethyl, carbomethoxymethyl, carbethoxymethyl, sulfomethyl, sulfamidomethyl, β-carboxyethyl, β-sulfatoethyl, n-propyl, β-carboxypropyl, β-sulfatoethyl, β-ethoxyethyl, β-methoxypropyl, γ-chloropropyl, γ-bromopropyl, n-butyl, isobutyl, cyclohexyl, phenyl, 2-chlorophenyl, 3-chlorophenyl, 4-chlorophenyl, 2- or 3- or 4-sulfophenyl, 2-methylphenyl, 4-methoxyphenyl, 3-methylphenyl and 4-ethylphenyl. Of these, preference is given to the substituted or unsubstituted alkyl groups and particular preference is given to the methyl and the ethyl group and the hydrogen atom.

In the radical W, arylene radicals are preferably phenylene and naphthylene radicals, which may contain one or more, such as 2 or 3, preferably 1 or 2, substituents belonging, for example, to the group of substituents comprising sulfo, carboxy, alkyl of 1 to 4 carbon atoms, such as methyl and ethyl, halogen, such as fluorine, chlorine and bromine, hydroxy, cyano, alkoxy of 1 to 4 carbon atoms, such as methoxy and ethoxy, sulfamoyl, trifluoromethyl and alkoxycarbonyl of 2 to 5 carbon atoms, such as methoxycarbonyl and ethoxycarbonyl. Of these, W is preferably a phenylene radical, which can be substituted by the abovementioned substituents, the substituents from the group comprising alkyl of 1 to 4 carbon atoms, chlorine, alkoxy of 1 to 4 carbon atoms, carboxy and sulfo being preferred.

Alkylene radicals in the radical W are preferably straight-chain and branched alkylene groups of 2 to 6 carbon atoms, which can be interrupted by the hetero groups mentioned, such as 1 or 2 of these hetero groups, and substituted by one or more water-solubilizing groups, such as sulfo, carboxy, sulfato and/or phosphato groups and/or other substituents, such as hydroxy, acetyloxy and cyano groups. Of these, straight-chain alkylene groups of 2 to 4 carbon atoms or an alkylene group of 4 carbon atoms interrupted by an oxygen atom or an amino or methylamino group are preferred.

If the formula radical W is an alkylenearylenealkyl radical, the alkylene radical in these groups is preferably a straight-chain radical of 1 to 3 carbon atoms and the arylene radical is preferably a 1,3- or in particular 1,4-phenylene radical, which can be substituted by one or more water-solubilizing groups. Alkylenearylene radicals are in particular the radicals of the formulae —CH$_2$—CH$_2$-phenylene- and —CH$_2$-phenylene-.

Examples of groups of the formulae (2a) and (2b) are: 2-(β-sulfatoethylsulfonyl)phenylamino, 3-(β-sulfatoethylsulfonyl)phenylamino, 4-(β-sulfatoethylsulfonyl)phenylamino, 2-carboxy-5-(β-sulfatoethylsulfonyl)phenylamino, 2-chloro-3-(β-sulfatoethylsulfonyl)phenylamino, 2-chloro-4-(β-sulfatoethylsulfonyl)phenylamino, 2-ethoxy-4- or -5-(β-sulfatoethylsulfonyl)phenylamino, 2-ethyl-4-(β-sulfatoethylsulfonyl)phenylamino, 2-methoxy-5-(β-sulfatoethylsulfonyl)phenylamino, 2,4-diethoxy-5-(β-sulfatoethylsulfonyl)phenylamino, 2,4-dimethoxy-5-(β-sulfatoethylsulfonyl)phenylamino, 2,5-dimethoxy-4-(β-sulfatoethylsulfonyl)phenylamino, 2-methoxy-5-methyl-4-(β-thiosulfatoethylsulfonyl)phenylamino, 2-methoxy-5-(β-thiosulfatoethylsulfonyl)phenylamino, 2-sulfo-4-(β-phosphatoethylsulfonyl)phenylamino, 2-sulfo-4-vinylsulfonylphenylamino, 2-hydroxy-4- or -5-(β-sulfatoethylsulfonyl)phenylamino, 2-chloro-4- or -5-(β-chloroethylsulfonyl)phenylamino, 2-hydroxy-3-sulfo-5-(β-sulfatoethylsulfonyl)phenylamino, 3- or 4-(β-acetoxyethylsulfonyl)phenylamino, 2-methoxy-4-[β-(N-methyltauryl)ethylsulfonyl]phenylamino, 5-(β-sulfatoethylsulfonyl)-naphth-2-yl-amino, 6- or 7- or 8-(β-sulfatoethylsulfonyl)naphth-2-yl-amino, 6-(β-sulfatoethylsulfonyl)-1-sulfonaphth-2-yl-amino, 5-(β-sulfatoethylsulfonyl)-1-sulfonaphth-2-yl-amino, 8-(β-sulfatoethylsulfonyl)-6-sulfonaphth-2-yl-amino, β-[4-(β'-sulfatoethylsulfonyl)phen]ethylamino, β-[2-sulfo-4-(β'-sulfatoethylsulfonyl)phen]ethylamino, β-(β'-chloroethylsulfonyl)ethylamino, β-(β'-sulfatoethylsulfonyl)ethylamino, β-(vinylsulfonyl)ethylamino, γ-(β'-chloroethylsulfonyl)propylamino, γ-(β'-sulfatoethylsulfonyl)propylamino, γ-(β'-bromoethylsulfonyl)propylamino, γ-(vinylsulfonyl)propylamino, 1-methyl-1-(β-sulfatoethylsulfonyl)-1-ethylamino, β-(β'-sulfatoethylsulfonyl)butylamino, 2-methyl-2-(β-chloroethylsulfonyl)-1-propylamino, ω-(β'-chloroethylsulfonyl)pentylamino, β-(β'-chloroethylsulfonyl)-n-hexylamino, N-methyl-N-[β-(β'-chloroethylsulfonyl)ethyl]amino, N-ethyl-N-[β-(β'-chloroethylsulfonyl)ethyl]amino, N-n-propyl-N-[β-(β'-chloroethylsulfonyl)ethyl]amino, N-n-butyl-N-[β-(β'-chloroethylsulfonyl)ethyl]amino, N-carboxymethyl-N-[β-(β'-bromoethylsulfonyl)ethyl]amino, N-sulfatomethyl-N-[β-(β'-chloroethylsulfonyl)ethyl]amino, N-(β-carboxyethyl)-N-[γ'-(β''-chloroethylsulfonyl)-propyl]amino, N-(β-sulfatoethyl)-N-[γ'-(β''-chloroethylsulfonyl)propyl]amino, N-(β-sulfatoethyl)-N-[δ'-(δ''-chloroethylsulfonyl)butyl]amino, N-(β-ethoxyethyl)-N-[δ'-(δ''-chloroethylsulfonyl)butyl]amino, N-(γ-chloropropyl)-N-[β'-(β''-chloroethylsulfonyl)ethyl]amino, N-phenyl-N-[β-(β'-chloroethylsulfonyl)ethyl]amino, N-phenyl-N-[β-(β'-chloroethylsulfonyl)ethyl]amino, N-(2-methylphenyl)-N-[β-(β'-chloroethylsulfonyl)ethyl]amino, N-(4-methoxyphenyl)-N-[β-(β'-chloroethylsulfonyl)ethyl]amino, N-(3-sulfophenyl)-N-[β-(β'-chloroethylsulfonyl)ethyl]amino, N-(4-sulfophenyl)-N-[β-(β'-chloroethylsulfonyl)ethyl]amino, bis-[β-(β'-chloroethylsulfonyl)ethyl]amino, bis-[β-(β'-bromoethylsulfonyl)ethyl]amino, bis-[γ-(β'-chloroethylsulfonyl)propyl]amino, bis-[γ-(β'-chloroethylsulfonyl)butyl]amino, bis-(β-vinylsulfonylethyl)amino, N-(β-cyanoethyl)-N-[γ'-(β''-chloroethylsulfonyl)-propyl]amino, β-[β'-(β''-chloroethylsulfon-yl)ethylamino]ethylamino, β-[β'-(β''-sulfatoethylsulfonyl)ethylamino]ethylamino, β-[β'-(β''-chloroethylsulfonyl)ethoxy]ethylamino, β-[β!-(β''sulfatoethylsulfonyl)ethoxy]ethylamino, 4-[β-(β'-chloroethylsulfonyl)ethyl]piperazin-1-yl, 4-[γ-(β'-chloroethylsulfonyl)propyl]piperazin-1-yl, 4-[β-(β'-sulfatoethylsulfonyl)ethyl]-piperazin-1-yl, 4-[γ-(β -sulfatoethylsulfonyl)propyl]piperazin-1-yl, 4-{N-[β-(4'-β'-sulfatoethylsulfonylphenyl)ethyl]amidocarbonylmethoxy}phenylamino, 4-{N-[3'- or -4'-(β-sulfatoethylsulfonyl)phenyl]amidocarbonylmethoxy}phenylamino, 3,4-di-(β-sulfatoethylsulfonyl)phenylamino, 2,5-di-(β-sulfatoethylsulfonyl)phenylamino, 4-[γ-(β'--sulfatoethylsulfonyl)propoxy]phenylamino, 2,5-bis-[(β-sulfatoethylsulfonyl)methyl]-phenylamino, 3- or 4-{N-[γ-(β'-sulfatoethylsulfonyl)propylamidocarbonyl]}phenylamino, 3,5-bis-{N-[γ-(β'-sulfatoethylsulfonyl)propylamidocarbonyl]}phenylamino, 3-sulfo-4-{[N-γ-(β'-sulfatoethylsulfonyl)propylamidocarbonyl]- methoxy}phenylamino, 4{[N-7-(β'-sulfatoethylsulfonyl)propylamidocarbonyl]methoxy}phenylamino.

The grouping bound to the dye radical F and having the formula (3)

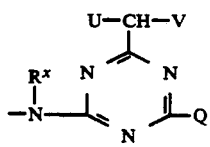
(3)

is preferably a radical of the formula (3a) or, particularly preferably, a radical of the formula (3b)

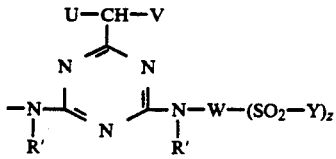
(3a)

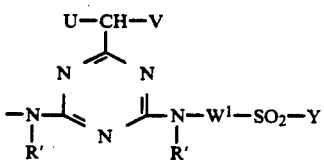
(3b)

in which both R' have meanings which are identical to or different from one another and are each a methyl or ethyl group or in particular a hydrogen atom and U, V, W, Y and z have the abovementioned, in particular preferred, meanings and $W^1$ is an alkylene group of 2 to 4 carbon atoms, preferably of 2 or, in particular, of 3 carbon atoms, or is a phenylene radical, preferably a 1,3- or 1,4-phenylene radical, which can be substituted by 1 or 2 substituents from the group comprising methyl, methoxy, ethoxy and chlorine, or is a group of the formula (a)

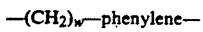
(a)

in which w is the number 1, 2, 3 or 4, preferably 2, and phenylene is a 1,3- or 1,4-phenylene radical.

Important azo dyes of the formula (1) are those in which F is a radical of a dye from the benzeneazonaphthol, benzeneazo-1-phenyl-5-pyrazolone, benzeneazobenzene, naphthaleneazobenzene, benzeneazoaminonaphthalene, naphthaleneazonaphthalene, naphthaleneazo-1-phenyl-5-pyrazolone, benzeneazopyridone and naphthaleneazopyridone series, the sulfo-containing dyes being preferred here too.

Of the 1:1 copper complex azo dyes according to the invention, those from the benzene and naphthalene series are preferred.

Examples of preferred monoazo and disazo dyes of the formula (1) are those of the formulae (4a) and (4b)

(4a)

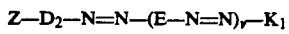
(4b)

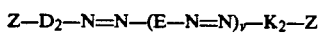
(4c)

and the heavy metal complex compounds derived therefrom, such as 1:1 copper complex compounds, in which $D_1$ is the radical of a diazo component from the benzene or naphthalene series, $D_2$ is the radical of a diazo component from the diaminobenzene or diaminonaphthalene series, E is the radical of a middle component from the benzene or naphthalene series, $K_1$ is the radical of a coupling component from the benzene, naphthalene, pyrazolone, 6-hydroxy-2-pyridone or acetoacetarylamide series, $K_2$ is a radical from the aniline, aminonaphthalene or 1-aminophenyl-pyrazolone series, it being possible for $D_1$, $D_2$, E, $K_1$ and $K_2$ to contain substituents customary for azo dyes, as mentioned above, for example, hydroxy, amino, methyl, methoxy, ethoxy, sulfo, carboxy, ureido, ($C_1$–$C_4$)-alkylureido, phenylureido, substituted or unsubstituted alkanoylamino groups of 2 to 4 carbon atoms in the alkanoyl radical, substituted or unsubstituted benzoylamino groups and halogen atoms, such as bromine and chlorine atoms, and together to contain at least one preferably at least two, particularly preferably three to five sulfo groups, v is the number zero or 1, and Z is a group of the formula (3) or, preferably, of the formula (3a) or (3b).

Furthermore, preference is given to disazo dyes of the formula (4d) or (4e)

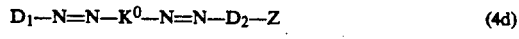
(4d)

(4e)

in which Z has the abovementioned meaning, $D_1$ and $D_2$, in each case identical to or different from one another, are the radical of a diazo component from the benzene or naphthalene series and $K^0$ is the radical of a bivalent coupling component from the naphthalene series, it being possible for $D_1$, $D_2$ and $K^0$ to carry the substituents customary for azo dyes, such as the ones already mentioned above, $D_1$, $D_2$ and $K^0$ together containing at least two water-solubilizing groups, such as sulfo, carboxy, sulfato and phosphato groups, such as 2 to 5 of these groups.

Such azo dyes of the formula (1) are in particular dyes of the formulae (4f), (4g) and (4h)

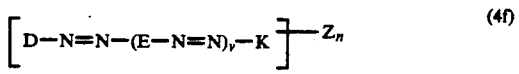
(4f)

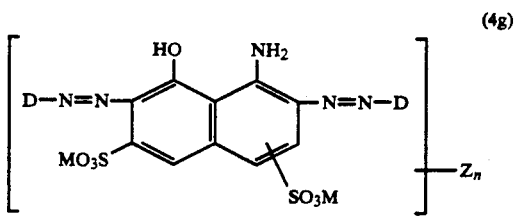
(4g)

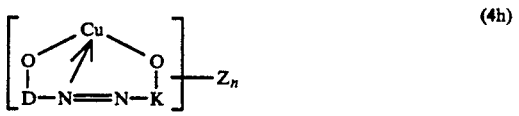
(4h)

in which

Z is a radical of the formula (3) or (3a) or (3b), n is the number 1 or 2, preferably 1, the radical Z is bound to the radical D or to the radical K or, in the case where n is 2, in each case to the radicals D and K or to both radicals D, both radicals Z preferably not being bound to a radical D or to a radical K at the same time, each D is the radical of a diazo component to which additionally an azo radical can be bound and each of which can have a meaning which is identical to or different from that of the others and is, for example, a radical D of the meaning given above or below, E is the divalent radical of a couplable and diazotizable compound, for example of the meaning given above or below, K is the radical of a coupling component, to which additionally an azo radical can be bound, for example, of the meaning given above or below, v is the number zero or 1, and M is a hydrogen atom or an alkali metal, such as sodium, potassium or lithium.

Examples of preferred metal complex azo dyes according to the invention are copper complex azo dyes of the formula (4j)

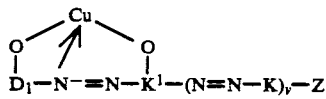

(4j)

in which $D_1$, K, v and Z have one of the abovementioned meanings and $D_1$ is preferably a radical apparent below from formula (5c) or (5d), and $K^1$ is the radical of an originally amino- and hydroxy -containing coupling component, such as, preferably, the radical of an aminonaphthol which is unsubstituted or substituted by 1 or 2 sulfo groups, the two oxy groups binding the copper in the form of a complex being bound to $D_1$ and $K^1$ in the ortho position or vicinal position relative to the azo group.

Examples of aromatic radicals of diazo components not carrying a fiber-reactive group of the formula (3), such as of those of the formulae $D-NH_2$ and $D_1-NH_2$, or $R^G D-NH_2$, are those of the formulae (5a), (5b), (5c) and (5d)

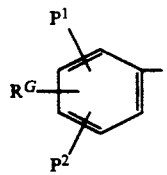

(5c)

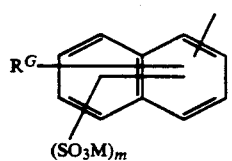

(5b)

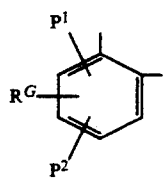

(5c)

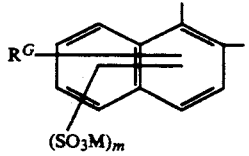

(5d)

in which $R^G$ is hydrogen, sulfo or a group the formula $Y-SO_2-$ where Y is as defined above, the group $Y-SO_2-$ maybe attached to the aromatic nucleus for example via an alkylene group of 1 to 4 carbon atoms, such as methylene or ethylene, or via an alkyleneamino group of 2 to 4 carbon atoms, such as n-propyleneamino or ethyleneamino, or via an alkylene group of 3 to 6 carbon atoms interrupted by 1 or 2 oxygen atoms, such as ethylene-oxy-ethylene, or via an alkyleneoxy group of 2 to 4 carbon atoms or via an alkyleneaminocarbonyl group having an alkylene radical of 2 to 4 carbon atoms, such as n-propyleneaminocarbonyl, or via an N-($C_1$-$C_4$-alkyl)amino oroup, such as N-methylamino, $P^1$ is hydrogen, methyl, ethyl, methoxy, ethoxy, alkanoyl of 2 to 5 carbon atoms, such as acetyl and propionyl, cyano, sulfo, carboxy, alkoxycarbonyl of 2 to 5 carbon atoms, such as methoxycarbonyl and ethoxycarbonyl, carbamoyl, N-($C_1$-$C_4$-alkyl)-carbamoyl, fluorine, chlorine, bromine or trifluoromethyl, $P^2$ is hydrogen, methyl, ethyl, methoxy, ethoxy, cyano, carboxy, sulfo, alkanoylamino of 2 to 5 carbon atoms, such as acetylamino, alkoxycarbonyl of 2 to 5 carbon atoms, such as methoxycarbonyl and ethoxycarbonyl, carbamoyl, N-($C_1$-$C_4$-alkyl)sulfamoyl, sulfophenylamidocarbonyl, or phenylamidocarbonyl containing a group $Y-SO_2$ as substituent in the phenyl radical where Y has the above meaning, alkylsulfonyl of 1 to 4 carbon atoms, phenylsulfonyl or phenoxy, it being possible for the benzene ring in formulae (5a) and (5b) to additionally contain a hydroxy group in the ortho position relative to the free bond leading to the azo group, m is the number zero, 1 or 2 (this group being a hydrogen atom in the case where m is zero) and M has the abovementioned meaning.

Of these, $P^1$ is preferably hydrogen, methyl, methoxy, bromine, chlorine, sulfo and carboxy and $P^2$ is preferably hydrogen, methyl, methoxy, chlorine, carboxy, sulfo and acetylamino.

Examples of groups of the formula (5a) and (5b) are: 2-($\beta$-sulfatoethylsulfonyl)phenyl, 3-($\beta$-sulfatoethylsulfonyl)phenyl, 4-($\beta$-sulfatoethylsulfonyl)phenyl, 2-carboxy-5-($\beta$-sulfatoethylsulfonyl)phenyl, 2-chloro-3-(sulfatoethylsulfonyl)phenyl, 2-chloro-4-($\beta$-sulfatoethylsulfonyl)phenyl, 2-ethoxy-4- or -5-($\beta$-sulfatoethylsulfonyl)phenyl, 2-ethyl-4-($\beta$-sulfatoethylsulfonyl)phenyl, 2-methoxy-5- or -4-($\beta$-sulfatoethylsulfonyl)phenyl, 2,4-diethoxy-5-($\beta$-sulfatoethylsulfonyl)phenyl, 2,4-dimethoxy-5-($\beta$-sulfatoethylsulfonyl)phenyl, 2,5-dimethoxy-4-($\beta$-sulfatoethylsulfonyl)phenyl, 2-methoxy-5-methyl-4-($\beta$-sulfatoethylsulfonyl)phenyl, 2- or 3- or 4-($\beta$-thiosulfatoethylsulfonyl)phenyl, 2-methoxy-5-($\beta$-thiosulfatoethylsulfonyl)phenyl, 2-sulfo-4-($\beta$-phosphatoethylsulfonyl)phenyl, 2-sulfo-4-vinylsulfonylphenyl, 2-hydroxy -4- or -5-($\beta$-sulfatoethylsulfonyl)phenyl, 2- chloro-4- or -5-(β-chloroethylsulfonyl)phenyl, 2-hydroxy-3-sulfo-5-(β-sulfatoethylsulfonyl)phenyl, 3- or 4-(β-acetoxyethylsulfonyl)phenyl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, 3- or 4-{β-[4-(β'-sulfatoethylsulfonyl)phen]ethylamino}phenyl, 3- or 4-{β-[2-sulfo-4-(β'-sulfatoethylsulfonyl)phen]ethylamino}phenyl, 3- or 4-[β-(β'-chloroethylsulfonyl)ethylamino]phenyl, 3- or 4-[β-(β'-sulfatoethylsulfonyl)ethylamino]phenyl, 3- or 4-[β-(vinylsulfonyl)ethylamino]phenyl, 3- or 4-[γ-(β'-chloroethylsulfonyl)propylamino]phenyl, 3- or 4-[γ-(β'-sulfatoethylsulfonyl)propylamino]phenyl, 3- or 4-[γ-(vinylsulfonyl)propylamino]phenyl, 3,4-di-(β-sulfatoethylsulfonyl)phenyl, 2,5-di-(β-sulfatoethylsulfonyl)phenyl, 4-[γ-(β'-sulfatoethylsulfonyl)propoxy]phenyl, 2,5-bis[(β-sulfatoethylsulfonyl)methyl]phenyl, 3- or 4-{N-[γ-(β'-sulfatoethylsulfonyl)propylamidocarbonyl]}phenyl, 3,5-bis{N-[γ-(β'-sulfatoethylsulfonyl)propylamidocarbonyl]}-phenyl, 3-sulfo-4-{N-[γ-(β'-sulfatoethylsulfonyl)propylamidocarbonyl]methoxy)phenyl and 4-{N-[γ-(β'-sulfatoethylsulfonyl)propylamidocarbonyl]methoxy}phenyl, furthermore 2-carboxyphenyl, 4-carboxyphenyl, 3-carboxyphenyl, 3-chloro-6-carboxyphenyl, 2-sulfophenyl, 3-sulfophenyl, 4-sulfophenyl, 2,5-disulfophenyl, 2,4-disulfophenyl, 3,5-disulfopheny-1,2-methyl-5-sulfophenyl, 2-methoxy-5-sulfophenyl, 2-methoxy-4-sulfophenyl, 3-sulfo-4-methoxyphenyl, 5-sulfo-2-ethoxyphenyl, 4-sulfo-2-ethoxyphenyl, 2-carboxy-5-sulfophenyl, 2,5-dimethoxy-4-sulfophenyl, 2,4-dimethoxy-5-sulfophenyl, 2-methoxy-5-methyl-4-sulfophenyl, 2-sulfo-4-methoxyphenyl, 2-sulfo-4 -methylphenyl, 2-methyl-4-sulfophenyl, 2-chloro-4-sulfophenyl, 2-chloro-5-sulfophenyl, 2-bromo-4-sulfophenyl, 2,6-dichloro-4-sulfophenyl, 2,6-dimethyl-3-sulfopheny1,2,6-dimethyl-4-sulfopheny1,3-acetylamino-6-sulfophenyl, 4-acetylamino-2-sulfophenyl, 4-sulfonaphth-1-y1,3-sulfonaphth-1-yl, 5-sulfonaphth-1-yl, 6-sulfonaphth-1-yl, 7-sulfonaphth-1-yl, 3,7-disulfonaphth-1-yl, 3,6,8-trisulfonaphth-1-yl, 4,6,8-trisulfonaphth-1-yl, 5-sulfonaphth-2-yl—, 6- or 8-sulfonaphth-2-yl, 3,6,8-trisulfonaphth-2-yl, 6,8-disulfonaphth-2-yl, 1,6-disulfonaphth-2-yl, 1-sulfonaphth-2-yl, 1,5-disulfonaphth-2-yl, 3,6-disulfonaphth-2-vl and 4,8-disulfonaphth-2-yl.

Aromatic radicals Z—D— or Z—D$_2$— of compounds of the formulae Z—D—NH$_2$ or Z—D$_2$—NH$_2$ which serve as diazo components or of diaminobenzene and diaminonaphthalene compounds thereof of the formulae H$_2$N-D—NH$_2$ or H$_2$N—D$_2$—NH$_2$ are preferably radicals of the formulae (6a) and (6b)

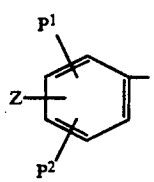
(6a)

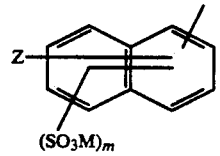
(6b)

in which Z, M, m, P$^1$ and P$^2$ have the abovementioned, in particular preferred, meanings, it being possible for the benzene ring additionally to contain a hydroxy group in the ortho position relative to the free bond leading to the azo group.

Examples of aromatic radicals E of a couplable and diazotizable compound of the formula H—E—NH$_2$ are those of the formulae (7a), (7b) and (7c)

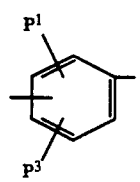
(7a)

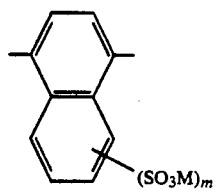
(7b)

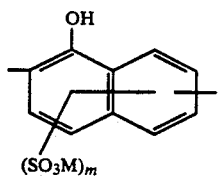
(7c)

in which

P$^1$, M and m have the abovementioned meanings and
P$^3$ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido of 1 to 4 carbon atoms in the alkyl radical, phenylsulfonyl or alkylsulfonyl of 1 to 4 carbon atoms.

Examples of radicals K or K$_1$ of coupling components of the formula H—K or H—K$_1$, not carrying any fiber-reactive group of the formula (3), are those of the formulae (8a) to (8h)

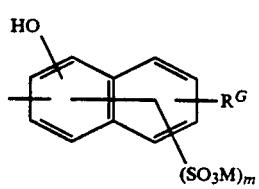
(8a)

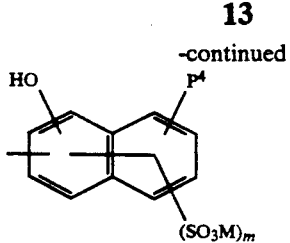 (8b)

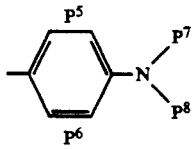 (8c)

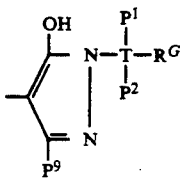 (8d)

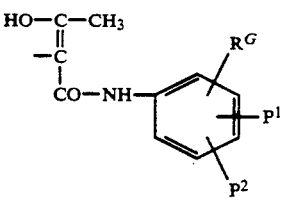 (8e)

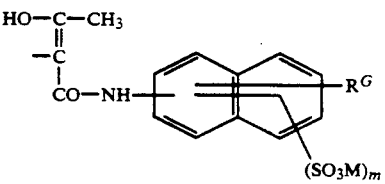 (8f)

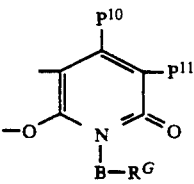 (8g)

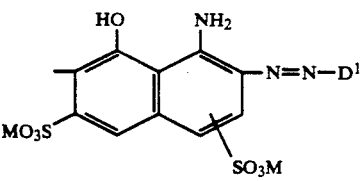 (8h)

in which $R^G$, $P^1$, $P^2$, m and M have the abovementioned meanings, $P^4$ is phenylureido which can be substituted in the phenyl radical by substituents from the group comprising chlorine, methyl, methoxy, sulfo, carboxy and by a group —$SO_2$—Y where Y has the above meaning, or is benzoylamino which can be substituted in the benzene radical by substituents from the group comprising chlorine, methyl, methoxy, nitro, sulfo, carboxy and by a group —$SO_2$—Y where Y has the above meaning, $P^5$ is hydrogen, alkyl of 1 to 4 carbon atoms, such as methyl and ethyl, alkoxy of 1 to 4 carbon atoms, such as methoxy and ethoxy, or is bromine, chlorine or alkanoylamino of 2 to 7 carbon atoms, such as acetylamino and propionylamino, $P^6$ is hydrogen, alkyl of 1 to 4 carbon atoms, such as methyl and ethyl, alkoxy of 1 to 4 carbon atoms, such as methoxy and ethoxy, or is chlorine or alkanoylamino of 2 to 7 carbon atoms, such as acetylamino and propionylamino, or is ureido or phenylureido, $P^7$ is hydrogen or alkyl of 1 to 4 carbon atoms, which can be substituted by hydroxy, cyano, carboxy, sulfo, sulfato, methoxycarbonyl, ethoxycarbonyl or acetoxy or by a group —$SO_2$—Y of the above definition, $P^8$ is alkyl of 1 to 4 carbon atoms, which can be substituted by hydroxy, cyano, carboxy, sulfo, sulfato, methoxycarbonyl, ethoxycarbonyl or acetoxy or by a group —$SO_2$—Y of the above definition, or is benzyl or phenyl or phenyl which is substituted by alkyl of 1 to 4 carbon atoms, alkoxy of 1 to 4 carbon atoms, chlorine and/or sulfo, it being possible for the phenyl radical to be substituted in each case by a group —$SO_2$—Y of the above definition, $P^9$ is hydrogen, alkyl of 1 to 4 carbon atoms, such as methyl, cyano, carboxy, carbalkoxy of 2 to 5 carbon atoms, such as carbomethoxy and carbethoxy, or is carbamoyl or phenyl, preferably methyl, carboxy, methoxycarbonyl, ethoxycarbonyl or phenyl and in particular methyl or carboxy, T is a benzene or naphthalene ring, preferably a benzene ring, $P^{10}$ is hydrogen or alkyl of 1 to 4 carbon atoms, such as methyl, or alkyl of 1 to 4 carbon atoms which is substituted by alkoxy of 1 to 4 carbon atoms, such as methoxy, or by cyano, preferably alkyl of 1 to 4 carbon atoms, or is phenyl, $P^{11}$ is hydrogen, chlorine, bromine, sulfo, carbamoyl, methylsulfonyl, phenylsulfonyl, cyano or sulfoalkyl of 1 to 4 carbon atoms, preferably hydrogen, sulfo, sulfoalkyl having an alkyl radical of 1 to 4 carbon atoms, such as sulfomethyl, or is cyano or carbamoyl, B is alkylene of 1 to 4 carbon atoms, methylenephenylene, ethylenephenylene, phenylenemethylene, phenylethylene or phenylene or methylenephenylene, ethylenephenylene or phenylene each of which may be substituted in the benzene radical by fluorine, chlorine, bromine, methyl, methoxy, cyano, sulfo, carboxy, acetyl, nitro, carbamoyl and/or sulfamoyl, and $D^1$ is a radical of the formula (5a) or (5b).

Examples of radicals —K—Z and —$K_2$—Z of coupling components of the formula H—K—Z and H—$K_2$—Z or H—K—N($R^x$)H and H—$K_2$—N($R^x$)H, in which the fiber-reactive radical of the grouping $Z^1$ defined below has to be incorporated afterwards are radicals of the formulae (9a) to (9h)

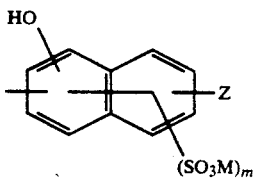 (9a)

-continued

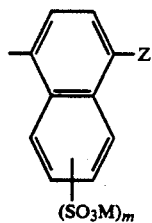

(9b)

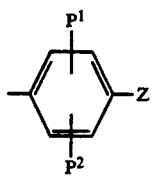

(9c)

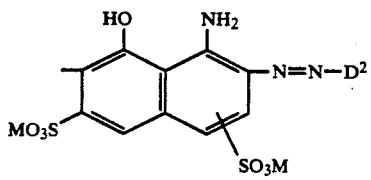

(9d)

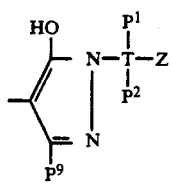

(9e)

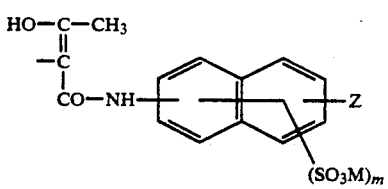

(9f)

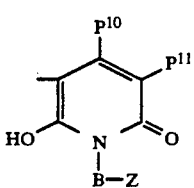

(9g)

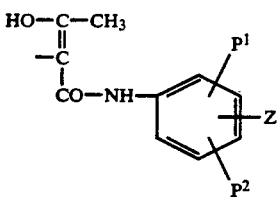

(9h)

in which

R, $P^1$, $P^2$, $P^9$, $P^{10}$, $P^{11}$, B, T, M, m and Z have the abovementioned, in particular preferred, meanings, and $D^2$ as radical of a diazo component is a radical of the abovementioned and defined formula (6a) or (6b).

In the above formulae (8a), (8b), and (9a), the free bond leading to the azo group is bound to the aromatic ring in the ortho position relative to the hydroxy group.

Radicals K and $K^1$ in the formulae (4h) and (4j) containing an oxygen atom bound in the form of a metal complex and containing the group Z are in particular those of the formulae (10a) to (10e)

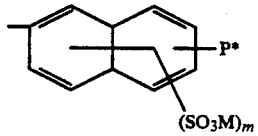 (10a)

 (10b)

(10c)

(10d)

 (10e)

in which the individual formula members have one of the abovementioned meanings and P* is either a radical Z or a grouping of the formula —N=N—K—Z.

Of the azo dyes, those are furthermore preferred which have the formulae (12A) to (12R)

(12A) 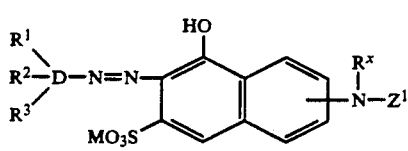

(12B) 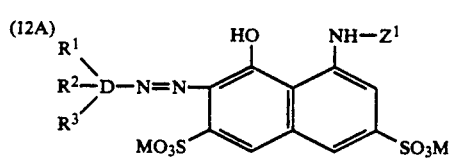

-continued
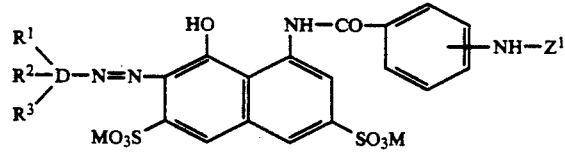 (12C)
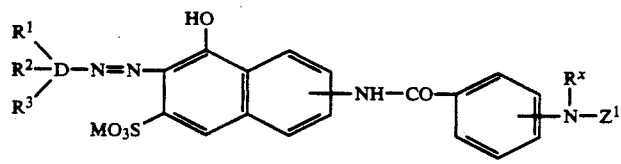 (12D)
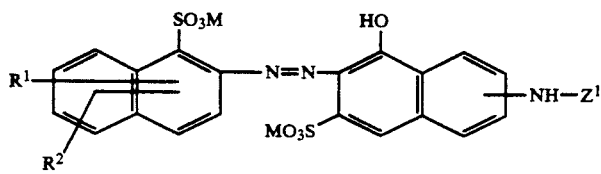 (12E)
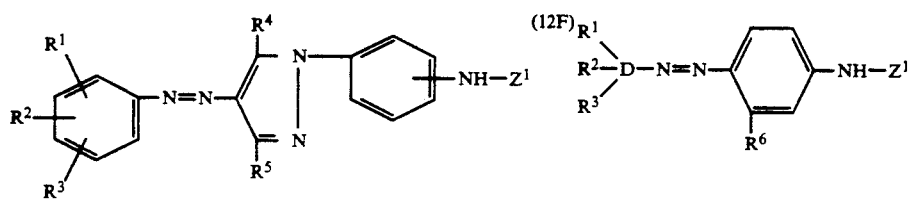 (12F) (12G)
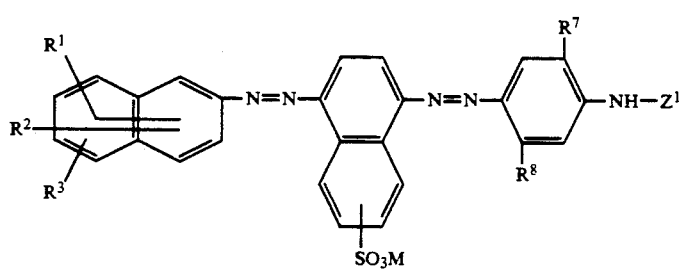 (12H)
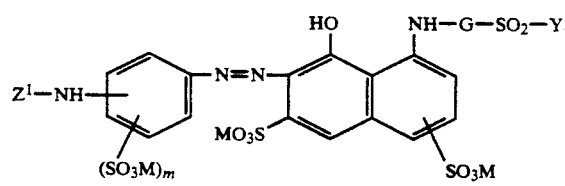 (12J)
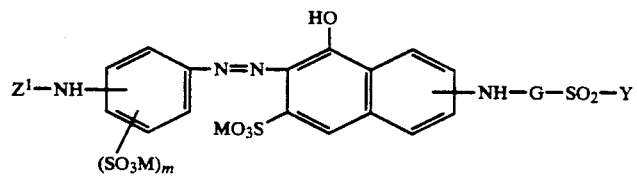 (12K)
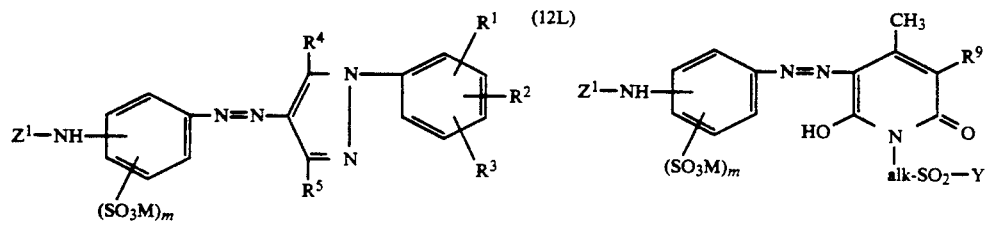 (12L) 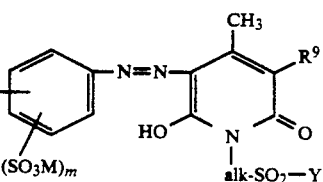 (12M)

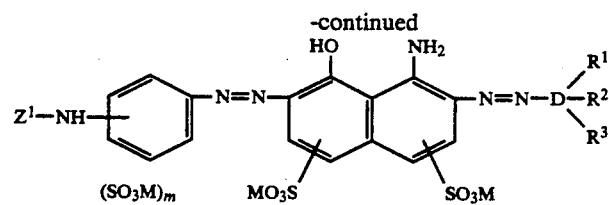

(12N)

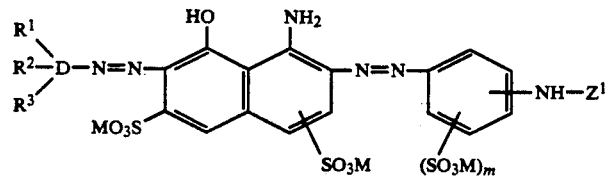

(12P)

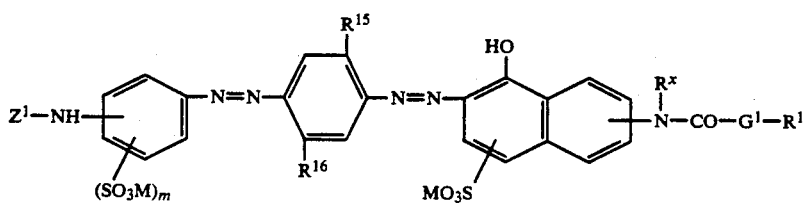

(12Q)

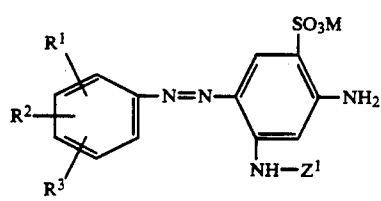

(12R)

in which:

Z¹ is a radical of the formula (3A), (3B) or (3C)

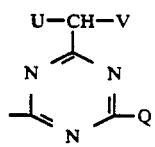     (3A)

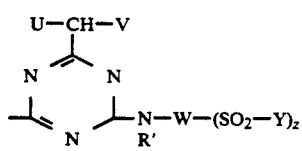     (3B)

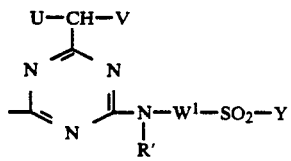     (3C)

in which U, V, R$^x$, Q, R', W¹, Y, Z and W have the abovementioned, in particular preferred, meanings;

M has one of the abovementioned meanings;

R$^x$ is hydrogen or alkyl of 1 to 4 carbon atoms, such as methyl or ethyl;

D is a benzene ring or is a naphthalene ring, the azo group being preferably bound to the naphthalene ring in the β-position and, in the case where D is a naphthalene ring, each R² and R³, independently of the other, being preferably a hydrogen atom or a sulfo group;

R¹ is hydrogen, sulfo, β-sulfatoethylsulfonyl, β-chloroethylsulfonyl or vinylsulfonyl;

R² is hydrogen, alkyl of 1 to 4 carbon atoms, such as ethyl and, in particular, methyl, alkoxy of 1 to 4 carbon atoms, such as ethoxy and, in particular, methoxy, halogen, such as chlorine and bromine, carboxy, sulfo, or a group of the formula —SO₂—Y where Y has the abovementioned meaning, such as β-sulfatoethylsulfonyl, β-chloroethylsulfonyl or vinylsulfonyl, and is preferably hydrogen;

R³ is hydrogen, alkyl of 1 to 4 carbon atoms, such as ethyl and, in particular, methyl, alkoxy of 1 to 4 carbon atoms, such as ethoxy and, in particular, methoxy, halogen, such as chlorine and bromine, carboxy or sulfo, preferably hydrogen;

R⁴ is hydroxy or amino, preferably hydroxy;

R⁵ is methyl, carboxyl, carbomethoxy or carbethoxy, preferably methyl or carboxy;

R⁶ is hydrogen, alkyl of 1 to 4 carbon atoms, such as methyl and ethyl, alkoxy of 1 to 4 carbon atoms, such as methoxy and ethoxy, halogen, such as bromine and, in particular, chlorine, preferably hydrogen, methyl, ethyl, methoxy, ethoxy or chlorine;

R⁸ is hydrogen or alkyl of 1 to 4 carbon atoms, such as methyl and ethyl, alkanoylamino of 2 to 5 carbon atoms, such as acetylamino and propionylamino, or is ureido, preferably hydrogen, methyl, ethyl, methoxy, ethoxy, acetylamino or ureido;

R⁹ is hydrogen, cyano, carbamoyl, sulfamoyl or sulfomethyl, preferably hydrogen or carbamoyl;

R¹⁰ is cyano, carbamoyl or sulfomethyl;

alk is alkylene of 2 to 4 carbon atoms, preferably ethylene;

G is alkylene of 2 to 4 carbon atoms, preferably ethylene or, in particular, n-propylene, or is carbonylphenylene;

$G^1$ is phenylene or is a radical of the formula $-NH-(CH_2)_3-$;

m is the number zero, 1 or 2 (this group being hydrogen in the case where m is zero);

q is the number zero or 1 (this group being hydrogen in the case where q is zero);

t is the number 2 or 3;

in the compounds of the formulae (12A), (12D), (12E), (12K) and (12Q), the amino grouping is bound to the 8-naphthol radical in the 2- or 3-position.

Of the anthraquinone dyes according to the invention, in particular those may be mentioned which have the formula (13)

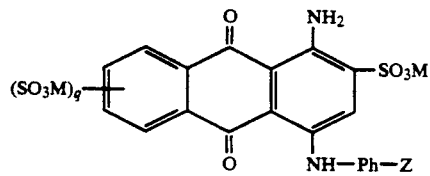

in which

M, Z and q have one of the abovementioned meanings, and

Ph is a phenylene radical which may be substituted by 1 or 2 substituents from the group comprising alkyl of 1 to 4 carbon atoms, such as methyl and ethyl, alkoxy of 1 to 4 carbon atoms, such as methoxy and ethoxy, halogen, such as chlorine and bromine, carboxy and sulfo.

Of the triphendioxazine dyes according to the invention, those may be mentioned which have the formula (14)

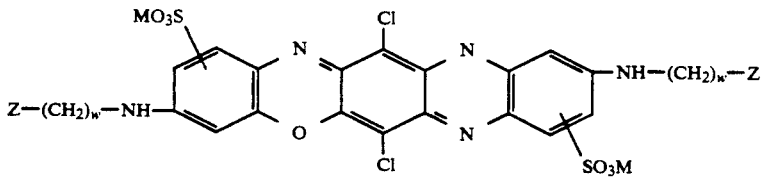

in which M and Z of one of the abovementioned meanings and w is the number 2, 3 or 4, the two sulfo groups —SO₃M being preferably bound to the benzene ring in the ortho position relative to the oxygen atom of the heterocyclic ring.

Of the phthalocyanine dyes according to the invention, those are preferred which have the formula (15)

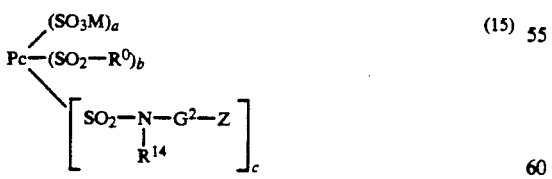

in which

Pc is the radical of a copper phthalocyanine or nickel phthalocyanine;

$R^0$ is an amino group of the formula $-NR^{11}R^{12}$ in which $R^{11}$ and $R^{12}$, independently of one another, are hydrogen or alkyl of 1 to 4 carbon atoms, which can be substituted by hydroxy or sulfo, or is a heterocyclic nitrogen-containing radical, such as morpholino or piperidino radical;

$R^{14}$ is a hydrogen or alkyl of 1 to 4 carbon atoms, such as methyl and ethyl;

$G^2$ is phenylene, which can be substituted by 1 or 2 substituents from the group comprising alkyl of 1 to 4 carbon atoms, such as ethyl and methyl, halogen, such as chlorine and bromine, carboxy and sulfo, for example sulfophenylene, or is alkylene of 2 to 6 carbon atoms, such as ethylene;

Z is a fiber-reactive group of the formula (3) or preferably (3a) or (3b);

a is a number from 0 to 3, b is a number from 0 to 3 and c is a number from 1 to 2, the sum of (a+b+c) being a number from 2 to 4.

Copper formazan dyes according to the invention are in particular those which have the formula (16)

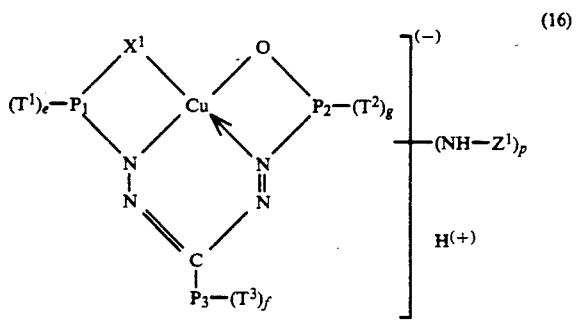

in which $X^1$ is an oxygen atom or, preferably, a carbonyloxy group of the formula —COO—;

$P_1$ and $P_2$, independently of one another, are each a benzene or naphthalene ring, $P_1$ containing the nitrogen atom and the group X bound in the ortho position relative to one another and $P_2$ containing the oxygen atom and the nitrogen atom bound in the ortho position relative to one another and it being possible for the benzene rings and naphthalene rings to be additionally substituted by one or two substituents from the group comprising halogen, such as chlorine, nitro, alkyl of 1 to 4 carbon atoms, such as ethyl and methyl, alkoxy of 1 to 4 carbon atoms, such as methoxy and ethoxy, sulfamoyl, by alkyl of 1 to 4 carbon atoms mono- or disubstituted sulfamoyl, alkylsulfonyl of 1 to 4 carbon atoms, such as methylsulfonyl and ethylsulfonyl, and phenysulfonyl, not only $P_1$ but also $P_2$ being preferably a benzene ring;

$P_3$ is a straight-chain or branched alkylene group of 2 to 6 carbon atoms, preferably of 2 to 4 carbon atoms, which can be substituted by a sulfophenyl group, or is a phenylene group or a naphthylene group, each of which can be substituted 1 or 2 substituents from the group comprising methyl, ethyl, methoxy, ethoxy and chlorine, $P_3$ being preferably a benzene ring;

$T^1$, $T^2$ and $T^3$, independently of one another, are each a sulfo or carboxy group, preferably a sulfo group;

e, f and g, independently of one another, are each the number 0, 1 or 2, the sum of (e+f+g) being an integer from 1 to 4 and preferably 2 or 3, in particular 2, the group $T^1$ or $T^2$ or $T^3$ being a hydrogen atom in the case of e or f or g being 0;

p is the number 1 or 2, preferably 1, it being possible for the group —NH—Z to be bound to an aromatic radical of $P_1$, $P_2$ or $P_3$ and it being preferably bound to $P_2$.

Of the copper formazan dyes of the formula (16), those are preferred in which $P_1$ and $P_2$ are both a benzene ring, the group —NH—Z is bound to $P_2$ and $T^1$ and $T^2$ are each a sulfo group, e and g both being the number 1. If the group —NH—Z is bound to $P_1$, e is the number 0 g is the number 2 and $T^2$ is a sulfo group. Furthermore, the grouping —$P_3$—$(T^3)_f$ is preferably a phenyl or a 2- or 4-sulfophenyl radical.

In all the formulae above and below, the individual formula members, not only those which have a different but also those which have a identical designation within a formula, can, in the context of their meaning, have meanings which are identical to or different from one another.

The present invention furthermore relates to processes for the preparation of the dyes according to the invention of the formula (1). They can be prepared, in a customary manner known per se analogously to known synthetic routes specific for the particular class of dyes, by reacting precursors typical of the particular dye, at least one of which contains a group of the formula (3), with one another, or by starting with an amino-containing starting compound of the formula (20)

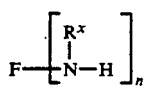
(20)

in which F, $R^x$ and n have the abovementioned meanings, and reacting it with a trihalo-s-triazine of the formula (21)

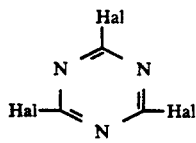
(21)

in which Hal is a halogen atom, such as, in particular, a chlorine or fluorine atom, with a compound of the formula H-Q and a compound of the formula $U^*$—$CH_2$—V, in which Q and V have the abovementioned meanings and $U^*$ has the meaning of U with the exception of a hydrogen atom, in stoichiometric amounts in any order (it also being, in all cases, possible for the group Y in the starting compounds to be a β-hydroxyethyl group) and then carrying out, if desired, further necessary conversion reactions known to one skilled in the art, such as, for example, in the case where starting compounds are used which contain a β-hydroxyethyl group instead of the group Y, to convert the compound obtained which contains the β-hydroxyethylsulfonyl group subsequently into the dye according to the invention which contains a group Y—$SO_2$— having the meaning mentioned in formula (1).

The dyes according to the invention can in particular be prepared according to the invention by reacting a compound of the formula (22)

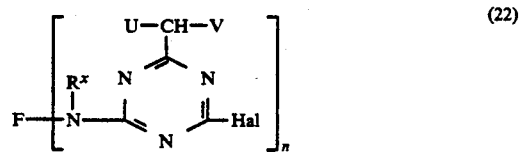
(22)

in which F, $R^x$, U, V and n have the abovementioned meanings and Hal is an halogen atom, such as, in particular, a chlorine or fluorine atom, with a compound of the formula H-Q or by reacting a compound of the formula (20) with a compound of the formula (23)

(23)

where Hal, U, V and Q have the abovementioned meaning, the grouping Y in these starting compounds may also be a β-hydroxyethyl group which is converted, as mentioned above, to a group Y as defined for formula (1).

The reactions of the starting compounds are carried out in aqueous or aqueous-organic medium in suspension or solution. If the reactions are carried out in an aqueous-organic medium, the organic medium is, for example, acetone, dimethylformamide and N-methyl-pyrrolidone. Advantageously, the hydrogen halide released during the condensation is continuously neutralized by addition of aqueous alkali metal hydroxides, alkali metal carbonates or alkali metal bicarbonates.

The reactions of the compounds of the formula (22) with a compound of the formula H-Q are, as a rule, carried out at a pH of between 2 and 5, preferably between 3 and 4, and at a temperature of between 30° and 90° C., preferably between 40° and 80° C., and the reactions of the compounds of the formula (20) with a halotriazine compound of the formula (23) are, as a rule, carried out at a pH of between 3 and 6, preferably between 4 and 5, and at a temperature of between 30° and 90° C., preferably between 40° and 80° C.

The triazine starting compounds can be prepared analogously to the procedure of U.S. Pat. Nos. 3,205,218 and 4,247,692. As a rule, the starting compounds of the formula (22) are prepared by reaction of an amino-containing starting compound of the formula (20) with a dihalotriazine compound of the formula (24)

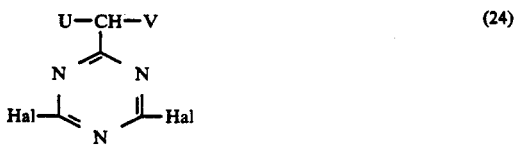
(24)

where Hal, U and V have the abovementioned meaning, at a pH of between 7 and 12, preferably between 7.5 and 10, and at a temperature of between 0° and 20° C., preferably between 0° and 5° C.

Likewise, the starting compounds of the formula (23) are obtained by reacting a trihalo-s-triazine, such as cyanuric chloride or cyanuric fluoride, with a compound of the formula H-Q and a compound of the formula U*—CH$_2$—V, in which Q and V have the abovementioned meanings, and U* has the meaning of U with the exception of a hydrogen atom, in any order, but preferably first reacting the trihalo-s-triazine with the compound of lowest basicity, which is usually the compound of the formula U*—CH$_2$—V. In this case, the reaction of the trihalo-s-triazine with the compound of the formula U*—CH$_2$—V is carried out, as a rule, at a pH of between 7.0 and 12, preferably between 7.5 and 10, and at a temperature of between 0° and 20° C., preferably between 0° and 5° C., and the subsequent reaction with a compound H-Q is, as a rule, carried out at a pH of between 2 and 5, preferably between 2.5 and 4, and at a temperature of between 0° and 30° C., preferably between 5° and 25° C.

The starting amines of the formula H-Q have been described in the literature in large numbers, thus, for example, in German Patent Nos. 887,505 and 965,902, in German Offenlegungsschriften Nos 2,040,620 and 2,614,550 and in European Patent Application Publications Nos. 0,107,614, 0,144,766, 0,159,292 and 0,278,904. Which of the abovementioned procedures can advantageously be used not only in the synthesis of the dyes of the formula (1) but also in the synthesis of the starting compounds with a triazine radical, depends, on the one hand, on the solubility of the starting compounds used and the intermediates and on the reaction conditions to be chosen in view of the basicity of the reactants to give a trihalo- or dihalo- or monohalo-s-triazine compound and can be decided from case to case by a small preliminary experiment. The preparation according to the invention of the dyes of the formula (1) by reaction of a compound of a formula (22) with a compound of the formula H-Q is particularly suitable in those cases where the starting compound (22) contains a group which is sensitive to alkali, such as, for ex., a fiber-reactive group —SO$_2$—Y which is particularly sensitive to alkali, and the reaction with a compound H-Q can be carried out under acidic or neutral conditions.

If, in contrast, the group Q can only be introduced under alkaline conditions into the dye molecule containing a group which is sensitive to alkali or into a suitable precursor containing a group which is sensitive to alkali, the reaction is preferably started with a starting compound in which the radical Y is a β-hydroxyethyl group.

Conversion of the β-hydroxyethylsulfonyl compound into a compound where Y is an ethyl group substituted in the β-position by a substituent which can be eliminated by alkali is carried out analogously to known procedures of such reactions which have been described in the literature in large numbers for dyes containing a fiber-reactive radical of the vinylsulfonyl type. As a rule, the β-hydroxyethylsulfonyl group is esterified, thus, for example, it is converted into the ester group of phosphoric acid, of a lower alkane carboxylic acid, of an aromatic sulfonic acid or preferably of sulfuric acid. This esterification reaction is carried out using the customary esterifying and acylating agents for such acids, such as, for example, acetic anhydride, polyphosphoric acid, phosphorus pentachloride and, in particular, 96–100 % strength sulfuric acid or sulfuric acid containing sulfur trioxide, such as oleum having a sulfur trioxide content of up to 35 %, or chlorosulfonic acid in order to introduce the sulfato group. The reaction with sulfuric acid or sulfuric acid containing sulfur trioxide is carried out at a temperature of between 0° C. and 25° C. The reaction with chlorosulfonic acid can also take place in a polar organic solvent, such as, for example, N-methylpyrrolidone, at 10° to 80° C.

The dyes according to the invention of the formula (1) can be converted in a customary and known procedure into dyes according to this invention of the formula (1) containing a different substituent, which can be eliminated by alkali, in the group Y. Such procedures have been described in the literature regarding fiber-reactive dyes containing a fiber-reactive radical of the vinylsulfonyl series in large numbers. Thus, dyes according to the invention containing a β-sulfatoethylsulfonyl radical can be converted into dyes according to the invention containing a vinylsulfonyl group by treatment with an alkali, such as in aqueous sodium hydroxide solution, at a temperature of 0° to 40° C. over a period of a few minutes Dyes according to the invention containing a β-thiosulfatoethylsulfonyl radical can be obtained, for example, from dyes containing a vinylsulfonyl group by reaction with sodium thiosulfate.

If the starting compounds in the synthesis according to the invention of the azo dyes are diazo and coupling components, the reactions are carried out by the customary procedure of diazotization and coupling reactions, thus the diazotization, as a rule, at a temperature of between −5° C. and +15° C. and a pH below 2 by means of a strong acid and alkali metal nitrite in, preferably, an aqueous medium, and the coupling reaction, as a rule, at a pH of between 1.5 and 4.5 in the case of an amino-containing coupling component and at a pH of between 3 and 7.5 in the case of a hydroxyl-containing coupling component and at a temperature of between 0° and 25° C., likewise preferably in aqueous medium.

In the synthesis according to the invention of heavy metal complex azo dyes, for example those of the formula (4j), the starting compounds are, as a rule, those azo compounds, being free of heavy metals, which contain in the coupling component a phenolic or naphtholic hydroxy group bound in the ortho position or vicinal position relative to the azo group and whose diazo component radical contains a hydrogen atom or a hydroxy group or a lower alkoxy group, such as a methoxy group, bound in the ortho position relative to the azo group, and the starting azo compounds being free of heavy metal, may also contain an acylamino radical, such as an acetylamino radical. For example, the synthesis of the copper complex azo dyes of the formula (4j) can be started with a starting compound of the formula (25)

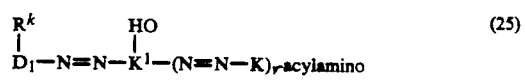

in which D$_1$, K, K$^1$ and v have one of the abovementioned meanings and R$^k$ is a hydrogen atom or a hydroxy or methoxy group bound to D$_1$ in the ortho position relative to the azo group, and this acylamino-containing starting azo compound can be reacted, analogously to known and customary procedures, with a copper-donating agent, such as a copper salt. If R$^k$ is a hydrogen atom or a methoxy group, the compound (25)

can be subjected to an oxidative or dealkylating copperization reaction to be carried out in the usual manner. The copper complex azo compound now obtained which contains the acylamino group can then be reacted, analogously to known procedures, after or with hydrolysis of the acylamino group to the amino group using a cyanuric halide or a compound of the formula (23), to give the dye according to the invention of the formula (1).

Examples of starting compounds which contain a fiber-reactive group —SO$_2$—Y and can serve as diazo components are: 2-($\beta$-sulfatoethylsulfonyl)aniline, 3-($\beta$-sulfatoethylsulfonyl)aniline, 4-($\beta$-sulfatoethylsulfonyl)aniline, 2-carboxy-5-($\beta$-sulfatoethylsulfonyl)aniline, 2-chloro-3-(sulfatoethylsulfonyl)aniline, 2-chloro-4-($\beta$-sulfatoethylsulfonyl)aniline, 2-ethoxy-4- or -5-($\beta$-sulfatoethylsulfonyl)aniline, 2-ethyl-4-($\beta$-sulfatoethylsulfonyl)aniline, 2-methoxy-5- or -4-($\beta$-sulfatoethylsulfonyl)aniline, 2,4-diethoxy-5-($\beta$-sulfatoethylsulfonyl)aniline, 2,4-di-methoxy-5-($\beta$-sulfatoethylsulfonyl)aniline, 2,5-dimethoxy-4-($\beta$-sulfatoethylsulfonyl)aniline, 2-methoxy-5-methyl-4-($\beta$-sulfatoethylsulfonyl)aniline, 2- or 3- or 4-($\beta$-thiosulfatoethylsulfonyl)aniline, 2-methoxy-5-($\beta$-thioethylsulfonyl)aniline, 2-sulfo-4-($\beta$-phosphatoethylsulfonyl)aniline, 2-sulfo-4-vinylsulfonylaniline, 2-hydroxy-4- or -5-($\beta$-sulfatoethylsulfonyl)aniline, 2-chloro-4- or -5-($\beta$-chloroethylsulfonyl)aniline, 2-hydroxy-3-sulfo-5-($\beta$-sulfatoethylsulfonyl)aniline, 3- or 4-($\beta$-acetoxyethylsulfonyl)aniline, 5-($\beta$-sulfatoethylsulfonyl)-2-aminonaphthalene, 6- or 7- or 8-($\beta$-sulfatoethylsulfonyl-2-aminonaphthalene, 6-($\beta$-sulfatoethylsulfonyl)-1-sulfo-2-aminonaphthalene, 5-($\beta$-sulfatoethylsulfonyl)-1-sulfo-2-aminonaphthalene, 8-($\beta$-sulfatoethylsulfonyl)- 6-sulfo-2-aminonaphthalene, 3- or 4-{$\beta$-[4-($\beta'$-sulfatoethylsulfonyl)phen]ethylamino}aniline, 3- or 4-{$\beta$-[2-sulfo-4-($\beta'$-sulfatoethylsulfonyl)phen]ethylamino}aniline, 3- or 4-[$\beta$-($\beta'$-chloroethylsulfonyl)ethylamino]aniline, 3- or 4-[$\beta$-($\beta'$-sulfatoethylsulfonyl)ethylamino]aniline, 3- or 4-[$\beta$-(vinylsulfonyl)ethylamino]aniline, 3-or 4-[$\gamma$-($\beta'$-chloroethylsulfonyl)propylamino]aniline, 3- or 4-[$\gamma$-($\beta'$-sulfatoethylsulfonyl)propylamino]aniline, 3- or 4-[$\gamma$-(vinylsulfonyl)propylamino]aniline, 3,4-di-($\beta$-sulfatoethylsulfonyl)aniline, 2,5-di-($\beta$-sulfatoethylsulfonyl)aniline, 4-[$\gamma$-($\beta'$-sulfatoethylsulfonyl)propoxy]aniline, 2,5-bis-[($\beta$-sulfatoethylsulfonyl)methyl]aniline, 3- or 4-{N-[$\gamma$-($\beta'$-sulfatoethylsulfonyl)propylamidocarbonyl]}aniline, 3,5-bis-{N-[$\gamma$-($\beta'$-sulfatoethylsulfonylpropylamidocarbonyl]}aniline, 3-sulfo-4-{N-[$\gamma$-($\beta'$-sulfatoethylsulfonyl)propylamidocarbonyl]methoxy}aniline and 4-{N-[$\gamma$-($\beta'$-sulfatoethylsulfonyl)propyamidocarbonyl]methoxy}aniline.

Examples of starting compounds of the formula H$_2$N-D-NH$_2$ and H$_2$N-D$_2$-NH$_2$ are 1,4-phenylenediamine, 2-sulfo-1,4-phenylenediamine, 2-carboxyl-1,4-phenylenediamine, 1,4-diamino-2-sulfonaphthalene, 2,6-diamino-8-sulfonaphthalene, 2,6-diamino-4,8-disulfonaphthalene, 1,3-phenylenediamine, 4-sulfo-1,3-phenylenediamine, 4,6-disulfo-1,3-phenylenediamine, 2,6-disulfo-1,4-phenylenediamine, 2,5-disulfo-1,4-phenylenediamine, 1,4-diamino-6-sulfonaphthalene, 4,4'-diamino-3-sulfobiphenyl and 4,4'-diaminostilbene-2,2'-disulfonic acid.

Examples of starting compounds of the formula H-E-NH$_2$ which can be used for the synthesis of the disazo dyes according to the invention and serve as coupling component and, after the coupling, as diazo component are aniline, 3-methylaniline, 2,5-dimethylaniline, 2,5-dimethoxyaniline, 3-methoxyaniline,3-acetylaminoaniline, 3-propionylaminoaniline, 3-butyrylaminoaniline, 3-benzoylaminoaniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 2-sulfo-5-acetylaminoaniline, 2-amino-5-naphthol-7-sulfonic acid, 2-amino-8-naphthol-6-sulfonic acid, 2-(4'-aminobenzoylamino)-5-naphthol-7-sulfonic acid, 1-(4'-amino-2-sulfophenyl)-3-methyl- or -3-carboxy-5-pyrazolone and 3-sulfo-4-amino-N-(acetoacetyl)anilide.

Starting compounds acting as coupling components for the synthesis of the azo dyes according to the invention and having a group —SO$_2$—Y, are, for ex., 1- 4'-($\beta$-sulfatoethylsulfonyl)phenyl]-3-methyl-5-pyrazolone, 1-[4'-(vinylsulfonyl)phenyl]-3-methyl-5-pyrazolone, 1-[4'-($\beta$-sulfatoethylsulfonyl)phenyl]-3-carboxy-5-pyrazolone, 1-[3'-($\beta$-chloroethylsulfonyl)benzoylamino]-3,6-disulfo-8-naphthol, 1-[3'-(vinylsulfonyl)benzoylamino]-3,6-disulfo-8-naphthol, 1-[3'-(vinylsulfonyl)benzoylamino]-4,6-disulfo-8-naphthol, 1-[3'-($\beta$-sulfatoethylsulfonyl)benzoylamino]-4,6-disulfo-8-naphthol, 2-[3'-($\beta$-chloroethylsulfonyl)benzoylamino]-6-sulfo-8-naphthol, 2-[3'-(vinylsulfonyl)benzoylamino]-6-sulfo-8-naphthol, 3-[3'-($\beta$-chloroethylsulfonyl)benzoylamino]-6-sulfo-8-naphthol, 3-[3'-(vinylsulfonyl)benzoylamino]-6-sulfo-8-naphthol, 6-sulfo-1-[3'-($\beta$-chloroethylsulfonyl)benzoylamino]naphthol, 7-sulfo-[3'-(vinylsulfonyl)benzoylamino]naphthol, 2-[N-methyl-N-($\beta$-sulfatoethylsulfonyl)amino]-6-sulfo-8-naphthol, 3-[N-methyl-N-($\beta$-sulfatoethylsulfonyl)amino]-6-sulfo-8-naphthol, 2-[N-ethyl-N-($\beta$-sulfatoethylsulfonyl)amino]-6-sulfo-8-naphthol, 1-[N'- (3'-$\beta$-chloroethylsulfonylphenyl}ureido]-3,6-disulfo-8-naphthol, 1-[N'-(3'-vinylsulfonylphenyl)ureido]-3,6-disulfo-8-naphthol, 1-[N'-(3'-vinylsulfonylpropyl)ureido]-3,6-disulfo-8-naphthol, 1-[N'-(3'-$\beta$-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-$\beta$-chloroethylsulfonylpropyl)ureido]-4,6-disulfo-8-naphthol, 2-[N'-(3'-$\beta$-sulfatoethylsulfonylphenyl)ureido]-6-sulfo-8-naphthol, 2-[N'-(3'-chloroethylsulfonylpropyl)ureido]-6-sulfo-8-naphthol, 3-[N'-(3'-$\beta$-chloroethylsulfonylphenyl)ureido]-6-sulfo-8-naphthol, 3-[N'-(3'-vinylsulfonylpropyl)ureido]-6-sulfo-8-naphthol, 2-sulfo-5-[N'-(3''-$\beta$-chloroethylsulfonyl)phenyl]ureidoaniline, 3-[N'-(3''-$\beta$-sulfatoethylsulfonyl)phenyl]ureidoaniline and 6-sulfo-1-[N'-(3''-$\beta$-sulfatoethylsulfonyl)phenyl]ureido-8-naphthol.

Examples of coupling components of the formula H-K-N(R$^x$)H which can serve for the synthesis of the azo dyes according to the invention, in which the fiber-reactive radical Z is present in the coupling component, and which are used for initially preparing the amino-containing azo dyes of the formula (20), into the amino group —N(R$^X$)H of which the fiber-reactive radical Z$^1$ or another previously mentioned halotriazine radical can be or will be introduced afterwards, are aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-(hydroxyacetylamino)aniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 4-sulfo-1,3-diaminobenzene, 6-sulfo-2-methoxy-1-aminonaphthalene, 5,7-disulfo-2-aminonaphthalene, 1-amino-8-hydroxynaphthalene-4- sulfonic acid, 1-amino-8-hydroxynaphthalene-6-sulfonic acid, 1-amino-8-hydroxynaphthalene-2,4-disulfonic acid, 1-amino-8-naphthol-3,6-disulfonic acid, 1-amino-8-hydroxy-4,6-disulfonic acid, 1-amino-8-hydroxy-naphthalene-2,4,6-trisulfonic acid, 2-(methylamino)- and 2-(ethylamino)-5-hydroxynaphthalene-7-sulfonic acid, 2-amino-5-hydroxynaphthalene-1,7-disulfonic acid, 2-(methylamino)- and 2-(ethylamino)-8-hydroxynaphthalene-6-sulfonic acid, 2-amino-8-hydroxynaphthalene-3,6-disulfonic acid, 2-(4'-amino-3'-sulfophenylamino)-5-hydroxynaphthalene-7-sulfonic acid, 1-amino-8-hydroxy-2-(phenylazo)-naphthalene-3,6-disulfonic acid, 1-amino-8-hydroxy-2-(4'-sulfophenylazo)naphthalene-3,6-disulfonic acid, 1-amino-8-hydroxy-2-(2,,5'-disulfophenylazo)naphthalene-3,6-disulfonic acid, 1-($\beta$-aminoethyl)-3-cyano-4-methyl-6-hydroxy-2-pyridone, 1-($\gamma$-aminopropyl)-3-sulfomethyl-4-methyl-6-hydroxy-2-pyridone, 1,3-diaminobenzene, 3-[N,N-di-($\beta$-hydroxyethyl)]aminoaniline, 3-[N,N-di-($\beta$-sulfatoethyl)]amino-4-methoxyaniline, 3-(sulfobenzylamino)aniline, 3-(sulfobenzoylamino)-4-chloroaniline and 3-[N,N-di-(sulfobenzyl)]aminoaniline, 2-sulfo-5-acetylaminoaniline, 2-amino-5-naphthol-7-sulfonic acid, 2-amino-8-naphthol-6-sulfonic acid, 1-(4'-aminobenzoyl)amino-8-hydroxynaphthalene-3,6-disulfonic acid, 1-(4'-aminobenzoyl)amino-8-hydroxynaphthalene-4,6-disulfonic acid, 1-(3'-aminobenzoyl)amino-8-hydroxynaphthalene-3,6-disulfonic acid, 1-(3'-aminobenzoyl)amino-8-hydroxynaphthalene-4,6-disulfonic acid, 1-(2'-aminobenzoyl)amino-8-hydroxynaphthalene-3,6-disulfonic acid, 1-(2'-aminobenzoyl)amino-8-hydroxynaphthalene-4,6-disulfonic acid, 2-(3'-aminobenzoyl)amino-5-hydroxynaphthalene-7-sulfonic acid, 2-(2'-aminobenzoyl)amino-5-hydroxynaphthalene-7-sulfonic acid, 2-(4'-aminobenzoyl)amino-8-hydroxy-naphthalene-6-sulfonic acid, 2-(3'-aminobenzoyl)amino-8-hydroxynaphthalene-6-sulfonic acid, 2-(2'-aminobenzoyl)amino-8-hydroxynaphthalene-6-sulfonic acid, 2-(4'-aminobenzoyl)amino-5-naphthol-7-sulfonic acid, 1-(4'-amino- or 1-(4'-acetylamino-2-sulfophenyl)-3-methyl- or -3-carboxy-5-pyrazolone, N-(3-sulfo-4-aminoacetoacetylanilide), 1-amino-8-naphthol-3,6- or -4,6-disulfonic acid, 1-(3'-aminobenzoyl)- or 1-(4'-aminobenzoyl)amino-8-naphthol-3,6- or -4,6-disulfonic acid, 1-acetylamino-8-naphthol-3,6- or -4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methylamino)-8-naphthol-6-sulfonic acid, 1-(3'-amino- or 1-(3'-acetylamino-6'-sulfophenyl)-3-methyl- or -3-carboxy-5-pyrazolone, 2-(N-methyl-N-acetylamino)- or 2-methylamino-5-naphthol-7-sulfonicacid, N-methylaniline and N-propyl-m-toluidine.

If the starting compounds are diazo components of the formula H$_2$D-D-NH$_2$ or H$_2$D-D$_2$-NH$_2$, they can also be used in the form of the monoacylaminoamino compounds, the acyl radical being in particular an acetyl radical. These monoacylaminoamino compounds are first diazotized and coupled to a couplable compound; the acyl radical is then cleaved off hydrolytically, and the amino group now set free again in this manner can be linked to the fiber-reactive radical Z$^1$. Examples of such monoacylated diamines are 2-sulfo-5-acetylaminoaniline and 2-sulfo-4-acetylaminoaniline. Similarly, amino-containing coupling components can be used in the coupling reaction in the form of the acylamino derivative, which, here too, can be followed by cleaving of the acyl radical hydrolytically, in order to link the liberated amino group to the fiber-reactive group Z$^1$.

Bivalent coupling components which can serve for the synthesis of disazo dyes according to the invention and in which the bivalent coupling radical is linked to two diazo components, one or both of which contain a fiber-reactive radical Z, for example of dyes of the formulae (4d), (4e) or (4g) are, for example, resorcinol, 1,3-diaminobenzene, 5,5'-dihydroxy-7,7'-disulfo-2,2'-dinaphthylurea, 1,8-dihydroxy-3,6-disulfonaphthalene and, in particular, 1-amino-8-naphthol-3,6-disulfonic acid and 1-amino-8-naphthol-4,6-disulfonic acid.

The dyes according to the invention of the formula (1) are suitable for the dyeing and printing of a wide range of materials, such as silk, leather, wool, polyamide fibers and polyurethanes, and in particular of cellulose-containing fiber materials of any type. Examples of such fiber materials are the natural cellulose fibers, such as cotton, linen and hemp, and also cellulose itself and regenerated cellulose. The dyes of the formula (1) are also suitable for the dyeing or printing of hydroxy-containing fibers contained in blend fabrics, for example blends of cotton with polyester fibers or polyamide fibers.

The dyes according to the invention can be applied to the fiber material and fixed on the fiber in various ways, in particular in the form of aqueous dye solutions and printing pastes. They are not only suitable for the exhaust method but also for dyeing by the pad-dyeing method, whereby the goods are impregnated with aqueous, salt-containing or salt-free dye solutions and the dye is fixed after an alkali treatment or in the presence of alkali, if appropriate with the application of heat. The dyes according to the invention are particularly suitable for the so-called cold pad-batch method, after which the dye together with the alkali is applied to the pad-mangle and then fixed by several hours of storage at room temperature. After fixing, the dyeings or prints are thoroughly rinsed with cold and hot water, if appropriate with the addition of an agent acting as a dispersant and promoting the diffusion of the non-fixed portions. These dyeing and printing processes have been described in large numbers in the general technical literature and also in the patent literature.

Accordingly, the present invention also relates to the use of the dyes according to the invention of the formula (1) for the dyeing (including printing) of these materials and to processes for the dyeing (and printing) of such materials in a procedure customary per se, in which a dye of the formula (1) is used as the colorant, by applying the dye of the formula (1) in aqueous medium to the material and fixing it on the material by means of heat or by means of an alkaline compound or by means of both.

If anthraquinone dyes according to the invention have insufficient solubility in the alkaline dye liquor, this shortcoming can be remedied in the manner known from the literature by addition of dispersants or other non-colored compounds, for example a naphthalenesulfonic acid/formaldehyde condensation product or, in particular, anthraquinone-2-sulfonic acid.

The dyes of the formula (1) are distinguished by high reactivity, good fixation properties and very good build-up properties. Accordingly, they can be used in the exhaust dyeing method at low dyeing temperatures and require only short steaming times in the pad-steam method. The degrees of fixation are high, and the non-fixed portions can be easily washed off, the difference between degree of exhaustion and degree of fixation being remarkably small, i.e. the soaping loss is very low. The dyes of the formula (1) are also suitable especially for printing, in particular on cotton, but also for the printing of nitrogen-containing fibers, for example of wool or silk or of blend fabrics containing wool or silk. Furthermore, they are highly suitable for use in discharge printing and resist printing processes.

The dyeings and prints produced by means of the dyes according to the invention have, in particular on cellulose fiber materials, a high color strength and a high stability of the fiber-to-dye bond not only in the acidic but also in the alkaline region, furthermore good light fastness and very good wet fastness properties, such as wash, water, seawater, cross dyeing and perspiration fastnesses and good pleating fastness, hot press fastness and rub fastness.

The Examples which follow serve to illustrate the invention. Parts and percentages are by weight unless stated otherwise. Parts by weight relate to parts by volume as the kilogram relates to the liter.

The compounds described in these Examples by way of formulae are given in the form of the free acid; in general, they are prepared and isolated in the form of their alkali metal salts, such as lithium salts, sodium salts or potassium salts, and used for dyeing in the form of their salts. Likewise, the starting compounds and components given in the Examples below, in particular the Table Examples, in the form of the free acid can be used in the synthesis as such or in the form of their salts, preferably alkali metal salts The absorption maxima ($\lambda_{max}$) in the visible region given for the dyes according to the invention were determined using their alkali metal salts in aqueous solution. In the Table Examples, the $\lambda_{max}$ values are put in brackets next to the hue; the wavelengths are given in nm.

EXAMPLE A 146 parts of ethyl acetoacetate are added to a suspension of 184 parts of cyanuric chloride in 2000 parts of ice water, and the reaction is carried out at 0° C. to 5° C. while maintaining a pH of 8 to 9 by addition of aqueous 2N sodium hydroxide solution. The synthesis solution is then clarified, giving a light yellow solution of the compound of the formula

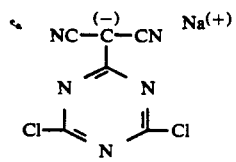

which is decomposable and can be used directly in the subsequent synthesis steps for the preparation of a dye according to the invention.

$^1$H NMR analysis (measured in a mixture of D$_2$O and H$_2$O with tetramethylsilane as internal standard): 1.19 ppm (3H; t), 2.2 ppm (3H; s), 4.18 ppm (2H; q).

$^{13}$C NMR analysis: 12.9 ppm, 27.9 ppm, 61.7 ppm, 104.9 ppm, 166.7 ppm, 169.1 ppm, 172.6 ppm, 195.1 ppm.

The methyl ester and isopropyl ester derivatives can be prepared analogously by reacting analogously as described above, cyanuric chloride with the equivalent amount of methyl acetoacetate or isopropyl acetoacetate.

EXAMPLE B 30.6 parts of acetylacetone are added at 0° C. to a suspension of 55 parts of cyanuric chloride in 600 parts of water. The reaction takes place at a pH of between 8 and 8.5, which is maintained by means of an aqueous 2N sodium hydroxide solution. The synthesis solution is then clarified, giving a light yellow solution of the compound of the formula

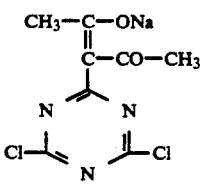

which can be used directly in the further synthesis steps for the preparation of a dye according to the invention.

$^1$H NMR analysis: 2.32 ppm (s) $^{13}$C NMR analysis: 32.0 ppm, 33.3 ppm, 60.0 ppm 117.2 ppm, 170.5 ppm, 204.5 ppm, 211.4 ppm.

EXAMPLE C

First 33.3 parts of malonitrile are dissolved in 150 parts of water at 40° C., the solution is cooled to 20° C., and 50 parts of ice are added. This gives a fine suspension of the malonitrile, which is then added to a suspension of 93 parts of cyanuric chloride in 500 parts of ice water. The reaction takes place while maintaining a pH of between 7 and 7.5 by means of an aqueous 2N sodium hydroxide solution over a period of about one hour.

The compound of the formula

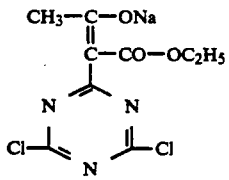

which precipitates as a finely crystalline substance can be isolated by filtration.

$^{13}$C NMR analysis: 47.0 ppm, 118.7 ppm, 167.5 ppm, 174.9 ppm.

EXAMPLE 1

An aqueous solution of 218 parts of 3-($\beta$-sulfatoethylsulfonyl)aniline in 1000 parts of water having a pH of 5 is added to the clear solution obtained according to Example A, and the reaction is carried out at 20° C. while maintaining a pH of 5.5.

A clear solution of the compound of the formula

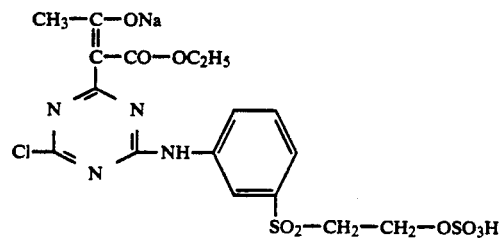

is obtained and then reacted with 371 parts of the azo compound 7-(2'-sulfo-4'-methoxyphenyl)azo-8-hydroxy-6-sulfo-3-amino-naphthalene at a pH of 4 to 5 and a temperature of about 35° C.

The azo dye according to the invention obtained is isolated by salting out with sodium chloride. Written in the form of the free acid, it has the formula

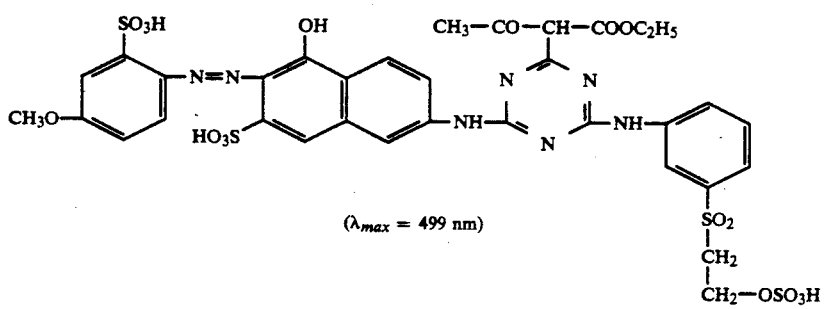

($\lambda_{max}$ = 499 nm)

and has very good fiber-reactive dye properties. It dyes, for example, cellulose fiber materials, such as cotton, by the application and fixation processes known in the art for fiber-reactive dyes in scarlet hues of good fastness properties.

EXAMPLE 2

To prepare an azo dye according to the invention, the procedure of Example 1 is repeated, except that, after reaction of the aminoazo compound with the chlorotriazine compound, the dye solution obtained is heated at 70° C. and a pH of 5 for two hours in order to cleave off the β-dicarbonyl group in the triazine radical.

The azo dye according to the invention obtained is isolated by salting out with sodium chloride. Written in the form of the free acid, it has the formula art for fiber-reactive dyes in scarlet hues of good fastness properties.

EXAMPLE 3

To prepare the monochlorotriazine compound, the procedure of Example 1 is repeated, except that the equivalent amount of 4-(β-sulfatoethylsulfonyl)aniline is used instead of 3-(β-sulfatoethylsulfonyl)aniline; 204 parts of 1-amino-3,6-disulfo-8-naphthol are added to the solution obtained of the monochlorotriazine compound and the reaction is carried out at 30° C. and a pH of 3 for three hours. A hydrochloric acid suspension of the diazonium salt prepared in the usual manner and obtained from 180 parts of 1,5-disulfo-2-naphthylamine is added at 0° to 5° C. to this solution of the coupling component obtained. The coupling reaction is carried out at a pH of between 5 and 5.5 and a temperature of about 10° C., and the azo dye according to the invention obtained is isolated in the usual manner.

Written in the form of the free acid, it has the formula

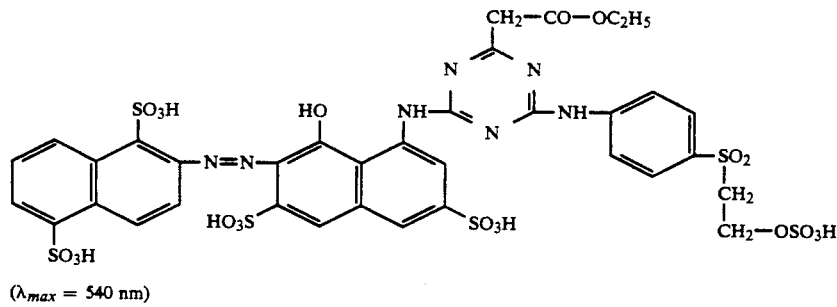

($\lambda_{max}$ = 540 nm)

and shows very good fiber-reactive dye properties and produces bluish red dyeings and prints of high color

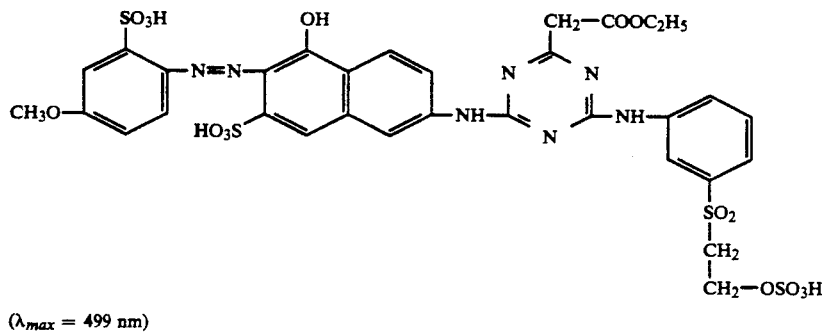

($\lambda_{max}$ = 499 nm)

and has very good fiber-reactive dye properties. It dyes, for example, cellulose fiber materials, such as cotton, by the application and fixation processes customary in the strength and good fastness properties by the application and fixation processes customary in the art for fiber-reactive dyes.

EXAMPLE 4

An aqueous solution of 218 parts of 4-(β-sulfatoethyl-sulfonyl)aniline in 1000 parts of water having a pH of 5 is added to the clear solution obtained according to Example A, that pH is brought to 3.5, and the reaction is carried out at 20° C. for two hours while maintaining this pH. A clear solution of the compound of the formula

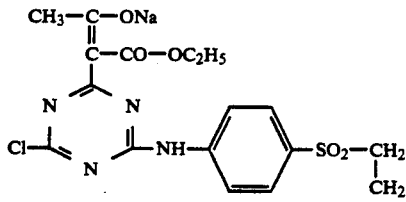

is obtained, and 370 parts of the azo compound 3-amino-7-(1',5'-disulfonaphth-2'-yl)-azo-6-sulfo-8-naphthol are added; the reaction is carried out at 40° to 45° C. at a pH of 4.5 for two hours, during which, in addition, cleavage of the β-dicarbonyl radical takes place.

The azo dye according to the invention obtained is isolated by salting out with sodium chloride. Written in the form of the free acid, it has the formula

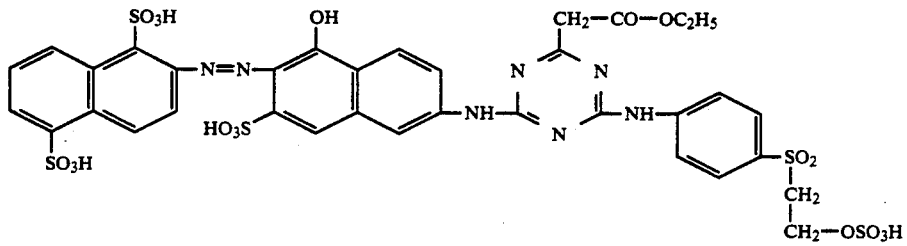

($\lambda_{max}$ = 483 nm)

and shows very good fiber-reactive dye properties and dyes the materials mentioned in the description, in particular cellulose fiber materials, such as cotton, in orange shades of high color strength and good fastness properties.

EXAMPLES 5 TO 61

In the Table Examples which follow, further azo dyes according to the invention are described by means of the components of the formula (A)

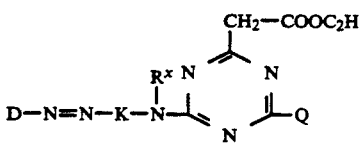

They can be prepared according to the invention, for example analogously to one of the above Examples, using the components apparent from the particular Table Example in combination with the formula (A) (such as the diazo component D-NH$_2$, the coupling component H-K-NR$^x$H, a halotriazine, ethyl acetoacetate and an amine of the formula H-Q). They exhibit very good fiber-reactive dye properties and dye the materials mentioned in the description, in particular cellulose fiber materials, such as cotton, in the hues given in the particular Table Example (here for cotton) which have high color strength and good fastness properties.

| Ex. | Radical D- | Radical —K—N(R$^x$)— | Radical -Q | Hue |
|---|---|---|---|---|
| 5 | 3,6,8-tri-sulfonaphth-2-yl | 3-ureido-1,4-phenylene-1-amino | 4-(β-sulfato-ethylsulfonyl)-phenylamino | reddish yellow (416) |
| 6 | 3,6,8-tri-sulfonaphth-2-yl | 3-ureido-1,4-phenylene-1-amino | 3-(β-sulfato-ethylsulfonyl)-propylamino | reddish yellow (416) |
| 7 | 3,6,8-tri-sulfonaphth-2-yl | 3-ureido-1,4-phenylene-1-amino | 3-(vinyl-sulfonyl)-phenylamino | reddish yellow (417) |
| 8 | 4,8-disulfo-naphth-2-yl | 3-acetyl-amino-1,4-phenylene-1 amino | 3-(β-sulfato-ethylsulfonyl)-phenylamino | reddish yellow (390) |
| 9 | 4,8-disulfo-naphth-2-yl | 3-acetyl-amino-1,4-phenylene-1 amino | 4-(β-sulfato-ethylsulfonyl)-phenylamino | reddish yellow (391) |
| 10 | 4,8-disulfo-naphth-2-yl | 3-acetyl-amino-1,4-phenylene-1 amino | 4-(β-sulfato-ethylsulfonyl)-phenethylamino | reddish yellow (392) |
| 11 | 4,8-disulfo-naphth-2-yl | 3-acetyl-amino-1,4-phenylene-1 amino | 3-(β-sulfato-ethylsulfonyl)-propylamino | reddish yellow (390) |
| 12 | 4,8-disulfo-naphth-2-yl | 3-acetyl-amino-1,4-phenylene-1 amino | 2,5-dimethoxy-4-(β-sulfato-ethylsulfonyl)-phenylamino | reddish yellow (391) |
| 13 | 4,8-disulfo-naphth-2-yl | 3-acetyl-amino-1,4-phenylene-1 amino | 2-methoxy-5-(β-sulfato-ethylsulfonyl)-phenylamino | reddish yellow (394) |
| 14 | 4,6,8-tri-sulfo-naphth-2-yl | 3-methyl-1,4-phenylene-1-amino | 3-(vinyl-sulfonyl)-phenylamino | reddish yellow (406) |
| 15 | 4,6,8-tri-sulfo-naphth-2-yl | 3-methyl-1,4-phenylene-1-amino | 4-(β-sulfato-ethylsulfonyl)-phenylamino | reddish yellow (407) |
| 16 | 1,5-di-sulfo-naphth-2-yl | 8-hydroxy-6-sulfo-3,7-naphthylene-3-amino | 3-(β-sulfato-ethylsulfonyl)-phenylamino | orange (483) |
| 17 | 1,5-di-sulfo-naphth-2-yl | 8-hydroxy-6-sulfo-3,7-naphthylene-3-amino | 3-(β-sulfato-ethylsulfonyl)-propylamino | orange (482) |
| 18 | 1,5-di-sulfo-naphth-2-yl | 8-hydroxy-6-sulfo-3,7-naphthylene-3-amino | 4-(β-sulfato-ethylsulfonyl)-phenethylamino | orange (482) |
| 19 | 1,5-di-sulfo-naphth-2-yl | 8-hydroxy-6-sulfo-7,3-naphthylene-3-(N-methyl-amino) | 4-(β-sulfato-ethylsulfonyl)-phenylamino | orange (485) |
| 20 | 6-(β-sul-fatoethyl- | 8-hydroxy-6-sulfo-3,7- | 4-(β-sulfato-ethylsulfonyl)- | orange (484) |

-continued

| Ex. | Radical D- | Radical —K—N(R$^x$)— | Radical -Q | Hue |
|---|---|---|---|---|
|  | sulfonyl)-1-sulfo-naphth-2-yl | naphthylene-3-amino | phenylamino |  |
| 21 | 6-(β-sulfatoethyl-sulfonyl)-1-sulfo-naphth-2-yl | 8-hydroxy-6-sulfo-3,7-naphthylene-3-amino | 3-(β-sulfato-ethylsulfonyl)-phenylamino | orange (484) |
| 22 | 4-methoxy 2-sulfo-phenyl | 8-hydroxy-6-sulfo-3,7-naphthylene-3-amino | 4-(β-sulfato-ethylsulfonyl)-phenethylamino | scarlet (499) |
| 23 | 4-methoxy 2-sulfo-phenyl | 8-hydroxy-6-sulfo-3,7-naphthylene-3-amino | 4-(β-sulfato-ethylsulfonyl)-phenylamino | scarlet (500) |
| 24 | 4-methoxy 2-sulfo-phenyl | 8-hydroxy-6-sulfo-3,7-naphthylene-3-amino | N-ethyl-4-(β-sulfatoethyl-sulfonyl)-phenylamino | scarlet (499) |
| 25 | 4-methoxy 2-sulfo-phenyl | 8-hydroxy-6-sulfo-3,7-naphthylene-3-amino | 3,4-di-(β-sulfatoethyl-sulfonyl)-phenylamino | scarlet (498) |
| 26 | 4-methoxy 2-sulfo-phenyl | 8-hydroxy-6-sulfo-3,7-naphthylene-3-amino | 2-methoxy-5-(β-sulfato-ethylsulfonyl)-phenylamino | scarlet (500) |
| 27 | 4-methoxy 2-sulfo-phenyl | 8-hydroxy-6-sulfo-3,7-naphthylene-3-amino | 6-(β-sulfato-ethylsulfonyl)-naphth-2-yl-amino | scarlet (501) |
| 28 | 2-sulfo-phenyl-amino | 8-hydroxy-4,6-disulfo-1,7-naphthy-lene-1-amino | 3-(β-sulfato-ethylsulfonyl)-phenylamino | yellowish red (531) |
| 29 | 2-sulfo-phenyl-amino | 8-hydroxy-4,6-disulfo-1,7-naphthy-lene-1-amino | 4-(β-sulfato-ethylsulfonyl)-phenylamino | yellowish red (532) |
| 30 | 2,5-di-carboxy-phenyl | 8-hydroxy-4,6-disulfo-1,7-naphthy-lene-1-amino | 4-(β-sulfato-ethylsulfonyl)-phenylamino | yellowish red |
| 31 | 2,5-di-carboxy-phenyl | 8-hydroxy-4,6-disulfo-1,7-naphthy-lene-1-amino | 3-(β-sulfato-ethylsulfonyl)-phenylamino | yellowish red |
| 32 | 2,5-di-carboxy-phenyl | 8-hydroxy-3,6-disulfo-1,7-naphthy-lene-1-amino | 3-(β-sulfato-ethylsulfonyl)-phenylamino | red |
| 33 | 2,5-di-carboxy-phenyl | 8-hydroxy-3,6-disulfo-1,7-naphthy-lene-1-amino | 4-(β-sulfato-ethylsulfonyl)-phenylamino | red |
| 34 | 2,5-di-carboxy-phenyl | 8-hydroxy-3,6-disulfo-1,7-naphthy-lene-1-amino | 3-(β-sulfato-ethylsulfonyl-propylamino | red |
| 35 | 2,5-di-carboxy-phenyl | 8-hydroxy-3,6-disulfo-1,7-naphthy-lene-1-amino | 4-(β-sulfato-ethylsulfonyl)-phenethylamino | red |
| 36 | 1,5-di-sulfo-naphty-2-yl | 8-hydroxy-3,6-disulfo-1,7-naphthy-lene-1-amino | 4-(β-sulfato-ethylsulfonyl)-phenethylamino | bluish red (540) |
| 37 | 1,5-di-sulfo-naphty-2-yl | 8-hydroxy-3,6-disulfo-1,7-naphthy-lene-1-amino | 4-(β-sulfato-ethylsulfonyl)-phenethylamino | bluish red (539) |
| 38 | 1,5-di-sulfo-naphty-2-yl | 8-hydroxy-3,6-disulfo-1,7-naphthy-lene-1-amino | 3-(β-sulfato-ethylsulfonyl)-phenylamino | bluish red (541) |
| 39 | 1,5-di-sulfo-naphty-2-yl | 8-hydroxy-3,6-disulfo-1,7-naphthy-lene-1-amino | N-ethyl-4-(β-sulfatoethyl-sulfonyl)-phenylamino | bluish red (541) |
| 40 | 4-(β-sulfato-ethyl-sulfonyl)-phenyl | 8-hydroxy-4,6-disulfo-1,7-naphthy-lene-1-amino | 4-(β-sulfato-ethylsulfonyl)-phenylamino | red (515) |
| 41 | 4-(β-sulfato-ethyl-sulfonyl)-phenyl | 8-hydroxy-4,6-disulfo-1,7-naphthy-lene-1-amino | 3-(β-sulfato-ethylsulfonyl)-phenylamino | red (514) |
| 42 | 2,5-di-sulfophenyl | 8-hydroxy-sulfo-3,7-naphthylene-3-amino | 3-(β-sulfato-ethylsulfonyl)-phenylamino | orange (491) |
| 43 | 2,5-di-sulfophenyl | 8-hydroxy-sulfo-3,7-naphthylene-3-amino | 4-(β-sulfato-ethylsulfonyl)-phenylamino | orange (490) |
| 44 | 1,5-di-sulfo-naphth-2-yl | 8-hydroxy-sulfo-3,7-naphthylene-3-amino | 4-(β-sulfato-ethylsulfonyl)-phenylamino | orange (483) |
| 45 | 4-(β-sulfato-ethylsulfonyl)-phenyl | 8-hydroxy-3,6-disulfo-1,7-naphthy-lene-1-amino | 3-(β-sulfato-ethylsulfonyl)-phenyl | red (520) |
| 46 | 4-(β-sulfato-ethylsul-fonyl)-phenyl | 8-hydroxy-3,6-disulfo-1,7-naphthy-lene-1-amino | 4-(β-sulfato-ethylsulfonyl)-phenylamino | red (520) |
| 47 | 4-(β-sulfato-ethylsul-fonyl)-phenyl | 8-hydroxy-3,6-disulfo-1,7-naphthy-lene-1-amino | γ-(β'-sulfato-ethylsulfonyl)-propylamino | red (521) |
| 48 | 4-(β-sulfato-ethylsulfonyl)-phenyl | 8-hydroxy-3,6-disulfo-1,7-naphthy-lene-1-amino | 4-(β-sulfato-ethylsulfonyl)-phenethylamino | red (518) |
| 49 | 4-(β-sulfato-ethylsulfonyl)-phenyl | 8-hydroxy-3,6-disulfo-1,7-naphthy-lene-1-amino | 2-methoxy-5-(β-sulfatoethyl-sulfonyl)-phenylamino | red (522) |
| 50 | 3-(β-suflato-ethylsulfonyl)-phenyl | 8-hydroxy-3,6-disulfo-1,7-naphthy-lene-1-amino | 4-(β-sulfato-ethylsulfonyl)-phenylamino | red (522) |
| 51 | 4-(β-sulfato-ethylsul-fonyl)-2-sulfophenyl | 8-hydroxy-3,6-disulfo-1,7-naphthy-lene-1-amino | 4-(β-sulfato-ethylsulfonyl)-phenylamino | yellowish red (520) |
| 52 | 6-(β-sulfato-ethylsul-fonyl)-1-sulfonaph-th-2-yl | 8-hydroxy-3,6-disulfo-1,7-naphthy-lene-1-amino | 4-(β-sulfato-ethylsulfonyl)-phenylamino | bluish red (542) |
| 53 | 4-sulfophenyl | 3-amino-4-sulfo-1,6-phenylene-1-amino | 4-(β-sulfato-ethylsulfonyl)-phenylamino | golden yellow (418) |
| 54 | 4-sulfophenyl | 3-amino-4-sulfo-1,6-phenylene-1-amino | 4-(β-sulfato-ethylsulfonyl)-phenylamino | golden yellow (418) |
| 55 | 4-sulfophenyl | 3-amino-4-sulfo-1,6-phenylene-1-amino | γ-(β'-sulfato-ethylsulfonyl)-propylamino | golden yellow (416) |
| 56 | 4-sulfophenyl | 3-carboxy-5-pyrazolon-4-yl-1-(4'-sulfophenyl)-4'-amino | 4-(β-sulfato-ethylsulfonyl)-phenylamino | yellow (435) |

-continued

| Ex. | Radical D- | Radical —K—N(R$^x$)— | Radical -Q | Hue |
|---|---|---|---|---|
| 57 | 4-sulfo-phenyl | 3-carboxy-5-pyrazolon-4-yl-1-(2'-sulfophenyl)-4'-amino | 3-(β-sulfato-ethylsulfonyl)phenylamino | yellow (434) |
| 58 | 4-(β-sulfato-ethylsul-fonyl)-phenyl | 3-carboxy-5-pyrazolon-4-yl-1-(2'-sulfophenyl)-4'-amino | 3-(β-sulfato-ethylsulfonyl)phenylamino | yellow (427) |
| 59 | 4-(β-sulfato-ethylsul-fonyl)-phenyl | 3-carboxy-5-pyrazolon-4-yl-1-(2'-sulfophenyl)-4'-amino | 4-(β-sulfato-ethylsulfonyl)phenylamino | yellow (427) |
| 60 | 2-sulfo-phenyl | 3-carboxy-5-pyrazolon-4-yl-1-(2'-sulfophenyl)-4'-amino | 4-(β-sulfato-ethylsulfonyl)phenylamino | yellow (428) |
| 61 | 2-sulfo-phenyl | 3-carboxy-5-pyrazolon-4-yl-1-(2'-sulfophenyl)-4'-amino | 3-(β-sulfato-ethylsulfonyl)phenylamino | yellow (429) |

EXAMPLE 62

To prepare an azo dye according to the invention, first cyanuric chloride is reacted by the procedure of Example A with methyl acetoacetate and the dichlorotriazine compound obtained is then reacted with 3-(β-sulfatoethylsulfonyl)-aniline by the procedure of Example 1. The monochlorotriazine compound thus obtained is then reacted with an equivalent amount of the azo compound 1-(4'-sulfophenyl)-3-carboxy-4-(5'-amino-2'-sulfophenyl)azo-5-pyrazolone at a temperature of about 35° C. and at a pH of 4 to 5. The dye solution obtained is then heated to 70° C. in order to carry out cleavage of the β-dicarbonyl group.

The azo dye according to the invention obtained which, written in the form of the free acid, has the formula

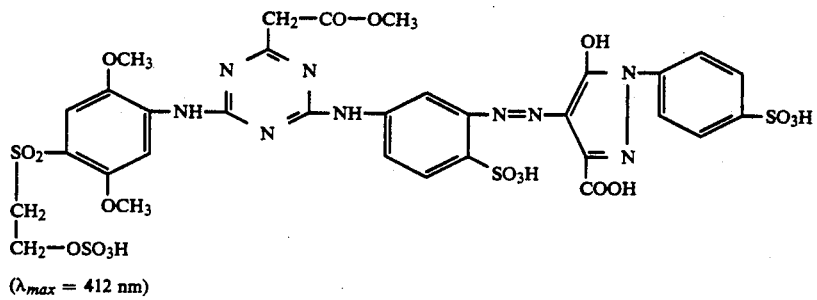

($\lambda_{max}$ = 412 nm)

is isolated from the synthesis solution in the usual manner. It has very good dye properties and dyes, for example, cellulose fiber materials by the dyeing methods customary in the art for fiber-reactive dyes in strong yellow shades.

EXAMPLE 63

Cyanuric chloride is reacted by the procedure of Example A with isopropyl acetoacetate, and the dichlorotriazine compound obtained is then reacted with 4-(β-sulfatoethylsulfonyl)aniline analogously to the procedure of Example 4. The clear solution obtained of this monochlorotriazine starting compound is then reacted with an equivalent amount of the aminodisazo compound 7-(5'-amino-2'-sulfophenyl)azo-2-(4''-β-sulfatoethylsulfonylphenyl)azo-3,6-disulfo-1-amino-8-hydroxynaphthalene at a temperature of 60° to 70° C. and a pH of 5. After cooling of the synthesis solution to 20° C., the azo dye according to the invention obtained is isolated in the usual manner. Written in the form of the free acid, it has the formula

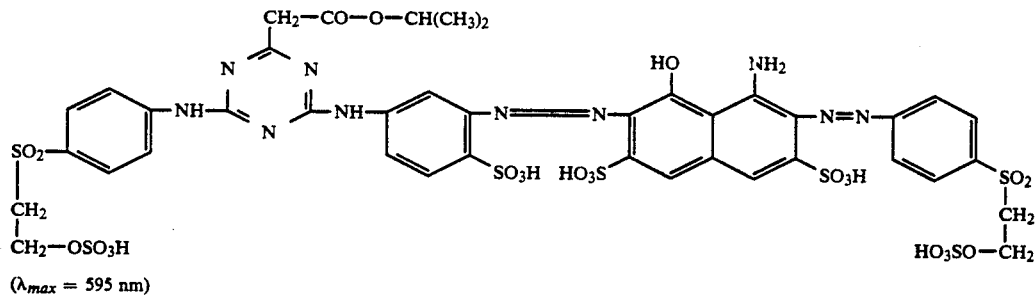

($\lambda_{max}$ = 595 nm)

and is distinguished by very good fiber-reactive dye properties. It dyes the materials mentioned in the description, such as, in particular, cellulose fiber materials, in navy hues of high color strength and good fastness properties.

EXAMPLES 64 TO 75

In the Table Examples which follow, further azo dyes according to the invention are described by means of the components of the formula (B)

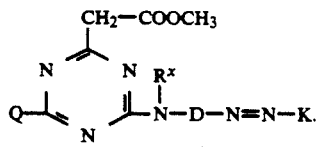

(B)

They can be prepared according to the invention, for example analogously to one of the above Working Examples, using the components apparent from the particular Table Example in combination with the formula (B) (such as a diaminophenylene or -naphthylene of formula $HR^x\text{-}N\text{-}D\text{-}NH_2$, The coupling component H-K, a halotriazine, methyl acetoacetate and an amine of the formula H-Q). They exhibit very good fiber-reactive dye properties and dye the materials mentioned in the description in particular cellulose fiber materials, such as cotton, in the hues given in the particular table example (here for cotton) which have high color strength and good fastness properties.

| Ex. | Radical —Q | Radical —D | Radical —K | Hue |
|---|---|---|---|---|
| 64 | 3-(β-sulfato-ethylsulfonyl)-phenylamino | ⌬-SO₃H | 1-N-(β-sulfoethyl)-4-methyl-2-hydroxypyrid-6-on-3-yl | greenish yellow |
| 65 | 4-(β-sulfatoethylsulfonyl)-phenylamino | " | 1-N-(β-sulfoethyl)-4-methyl-2-hydroxypyrid-6-on-3-yl | greenish yellow |
| 66 | γ-(β-sulfatoethylsulfonyl)-phenylamino | " | 1-N-(β-sulfoethyl)-4-methyl-2-hydroxypyrid-6-on-3-yl | greenish yellow |
| 67 | 3-(β-sulfatoethylsulfonyl)-phenylamino | ⌬-SO₃H | 1-N-(β-sulfoethyl)-4-methyl-2-hydroxypyrid-6-on-3-yl | greenish yellow |
| 68 | 3-(β-sulfatoethylsulfonyl)-phenylamino | ⌬-SO₃H | 1-N-ethyl-4-methyl-5-carboxamido-2-hydroxypyrid-6-on-3-yl | greenish yellow |
| 69 | 4-(β-sulfatoethylsulfonyl)-phenylamino | " | 1-N-ethyl-4-methyl-5-carboxamido-2-hydroxypyrid-6-on-3-yl | greenish yellow |
| 70 | 4-(β-sulfatoethylsulfonyl)- | " | 1-N-ethyl-4-methyl-5-carboxamido-2-hydroxypyrid-6-on-3-yl | greenish yellow |

-continued

| Ex. | Radical —Q | Radical —D | Radical —K | Hue |
|---|---|---|---|---|
|  | phenethylamino |  | 2-hydroxypyrid-6-on-3-yl |  |
| 71 | 4-(β-sulfatoethylsulfonyl)-phenylamino | 4,6-disulfo-1,3-phenylene | 1-N-ethyl-4-methyl-5-carboxamido-2-hydroxypyrid-6-on-3-yl | greenish yellow |
| 72 | 3-(β-sulfatoethylsulfonyl)-phenylamino | 4,6-disulfo-1,3-phenylene | 1-N-ethyl-4-methyl-5-carboxamido-2-hydroxypyrid-6-on-3-yl | greenish yellow |
| 73 | 3-(β-sulfatoethylsulfonyl)-phenylamino | 4,6-disulfo-1,3-phenylene | 1,4-dimethyl-5-carboxamido-2-hydroxypyrid-6-on-3-yl | greenish yellow |
| 74 | 3-(β-sulfatoethylsulfonyl)-phenylamino | ⌬-SO₃H | 1,4-dimethyl-5-sulfomethyl-2-hydroxypyrid-6-on-3-yl | greenish yellow |
| 75 | 4-(β-sulfatoethylsulfonyl)-phenylamino | ⌬-SO₃H | 1,4-dimethyl-5-sulfomethyl-2-hydroxypyrid-6-on-3-yl | greenish yellow |

EXAMPLE 76

An equivalent amount of the copper formazan compound of the formula

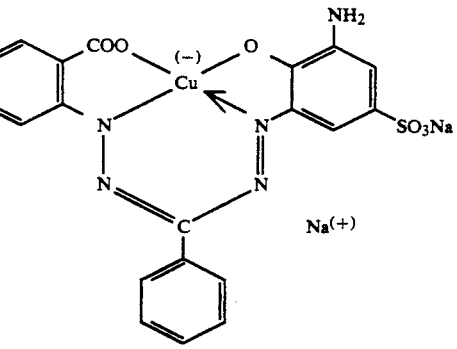

disclosed in European Patent Application Publication No. 0,382,111A is added to the solution of the monochlorotraizine compound [a reaction product of cyanuric chloride, ethyl acetoacetate and 3-(β-sulfatoethylsulfonyl)aniline] obtained according to Example 1, and the reaction of the chlorotriazine compound with the amino group of the copper formazan is carried out at a temperature of about 25° C. and a pH of about 5. The copper formazan dye according to the invention obtained is salted out as a sodium salt by means of sodium chloride. Written in the form of the free acid, it has the formula

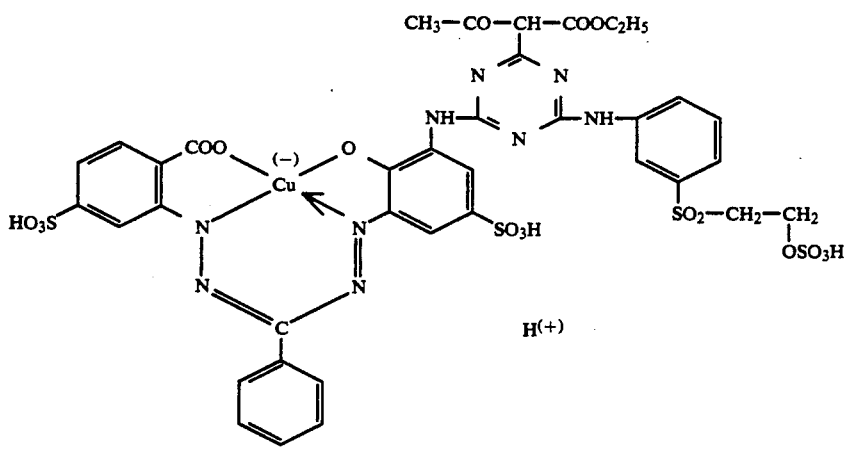

($\lambda_{max}$ = 608 nm)

and is distinguished by very good fiber-reactive dye properties. It dyes, for example, cellulose fiber materials by the dyeing methods customary in the art for fiber-reactive dyes in blue hues of high color strength and good fastness properties.

EXAMPLE 77

First the monochlorotriazine compound [the reaction product of cyanuric chloride, ethyl acetoacetate and 4-($\beta$-sulfatoethylsulfonyl)aniline] is prepared by the procedure of Example 4, the copper amino formazan starting compound mentioned in Example 76 is added thereto, and the reaction of the chlorotriazine compound with the amino group of the copper formazan is carried out at a temperature of 70° C. for three hours. During this reaction, cleavable of the $\beta$-dicarbonyl group can be monitored and controlled by thin-layer chromatography.

The dye according to the invention is isolated from the synthesis solution obtained as the sodium salt by salting out with sodium chloride. Written in the form of the free acid, it has the formula materials, by the dyeing methods customary in the art for fiber-reactive dyes.

EXAMPLE 81

The procedure of Example 76 is repeated, except that the reaction of the chlorotriazine compound with the copper amino formazan is carried out analogously to the procedure of Example 80° at 70° C. This gives a copper formazan dye according to the invention in the same good quality, this dye, as a result of the cleavage of the $\beta$-dicarbonyl group, differing in its constitution from the dye according to the invention of Example 76 in that an ethoxy carbonylmethyl group is bound to the triazine radical as the substituent instead of the (acetyl)-(ethoxycarbonyl)methyl radical as the substituent.

EXAMPLE 82

To prepare a disazo dye according to the invention, the procedure of Example 1 is repeated, except that the aminodisazo starting compound 4-[4'-(4",8"-disulfonaphth2"-yl)azo-6-sulfonaphth-1'-yl]azo-3-methylaniline preparable in a known manner is used instead of the

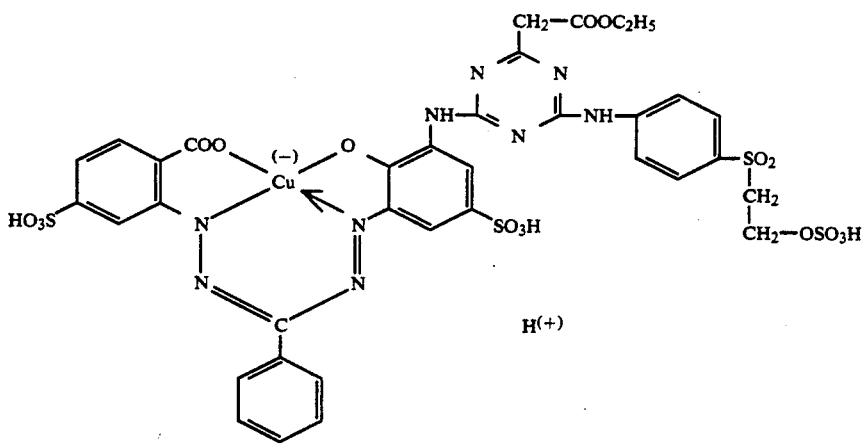

($\lambda_{max}$ = 608 nm)

and exhibits very good fiber reactive dye properties. It produces blue dyeings and prints of high color strength and good fastness properties on the materials mentioned in the description, such as, in particular, cellulose fiber amino-containing monoazo starting compound. This gives the disazo dye according to the invention of the formula (written in the form of the free acid)

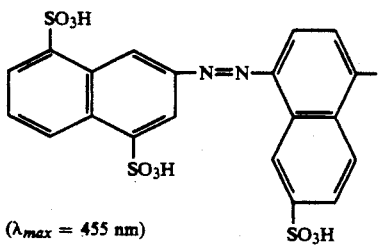
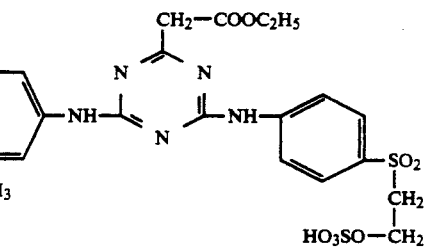

($\lambda_{max}$ = 455 nm)

which produces brown dyeings and prints of good fastness properties and high color strength on, for example, cellulose fiber materials.

We claim:
1. A dye of the formula

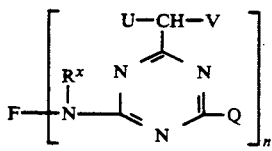

in which
F is the radical of a monoazo, disazo or polyazo dye or of a heavy metal complex azo dye derived therefrom, or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye;
$R^x$ is hydrogen or is alkyl of 1 to 4 carbon atoms unsubstituted or substituted by halogen, hydroxy, cyano, alkoxy of 1 to 4 carbon atoms, alkoxycarbonyl of 2 to 5 carbon atoms, carboxy, sulfamoyl, sulfo or sulfato,
n is the number 1 or 2;
U is a hydrogen, cyano, alkanoyl of 2 to 5 carbon atoms, alkoxycarbonyl of 2 to 5 carbon atoms, nitro, alkylsulfonyl of 1 to 4 carbon atoms or unsubstituted or substituted arylsulfonyl;
V is cyano, alkoxycarbonyl of 2 to 5 carbon atoms, aryloxycarbonyl unsubstituted or substituted, carboxy, alkylaminocarbonyl having an alkyl of 1 to 4 carbon atoms, arylaminocarbonyl unsubstituted or substituted in the aryl, alkylcarbonyl of 2 to 5 carbon atoms, substituted or unsubstituted arylcarbonyl, unsubstituted or substituted arylsulfonyl, aminocarbonyl, N,N-dialkylaminocarbonyl containing alkyls each having 1 to 4 carbon atoms, trifluoromethyl, nitro or alkylsulfonyl of 1 to 4 carbon atoms;
Q is a group of the formula

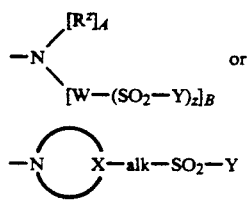

in which
$R^z$ is hydrogen or alkyl of 1 to 6 carbon atoms substituted or substituted by 1 or 2 substituents selected from the group consisting of halogen, hydroxy, cyano, alkoxy of 1 to 4 carbon atoms, carboxy, carbalkoxy of 2 to 5 carbon atoms, phenoxycarbonyl, alkanoyl of 2 to 5 carbon atoms, benzoyl, sulfobenzoyl, sulfamoyl, sulfo and sulfato, or unsubstituted or substituted by phenyl which is unsubstituted or substituted by substituents selected from the group consisting of halogen, alkoxy of 1 to 4 carbon atoms, alkyl of 1 to 4 carbon atoms, sulfo and carboxy, or substituted by a combination of those groups, or is cycloalkyl of 5 to 8 carbon atoms or is phenyl unsubstituted or substituted by substituents selected from the group consisting of halogen, alkoxy of 1 to 4 carbon atoms, alkyl of 1 to 4 carbon atoms, sulfo and carboxy,
W is an arylene, alkylene, alkylenearylene, arylenealkylene, alkylenearylenealkylene or arylenealkylenearylene, the alkylenes being those having 1 to 8 carbon atoms and are unsubstituted or substituted and the arylenes being unsubstituted or substituted phenylenes or naphthylenes, and the alkylenes are not or are interrupted by one or more hetero groups, and the alkylene and arylene moieties in the combined alkylene/arylene moieties are optionally separated from one another by a hetero group,
Y is vinyl, or is ethyl substituted in the β-position by a substituent which is eliminated by alkali,
Z is the number 1 or 2,
A is the number 0 or 1 and
B is the number 1 or 2,
the sum of (A+B) being the number 2 and, in the case where B is 2, the groups —W—($SO_2$—Y)$_z$ may have meanings which are identical to or different from one another,
X together with the nitrogen atom forms the bivalent radical of a heterocyclic ring composed of 1 to 2 alkyls of 1 to 5 carbon atoms or of 1 or 2 alkyls of 1 to 5 carbon atoms and 1 or 2 hetero groups, and
alk is an alkylene of 1 to 4 carbon atoms.
2. A dye as claimed in claim 1, wherein the group of the formula

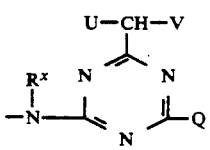

is a group of the formula

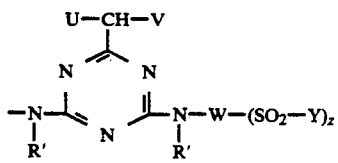

or

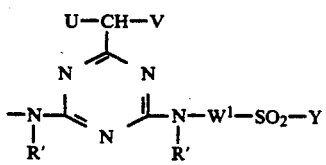

in which each R', being identical to or different from one an other, is methyl, ethyl or hydrogen, and $W^1$ is alkylene of 2 to 4 carbon atoms or phenylene unsubstituted or substituted by 1 or 2 substituents selected from the group consisting of methyl, methoxy, ethoxy and chlorine, or is a group of the formula —(CH$_2$)$_w$—phenylene— in which w is the number 1, 2, 3 or 4 and phenylene is 1,3- or 1,4-phenylene.

3. A dye as claimed in claim 1 of the formula

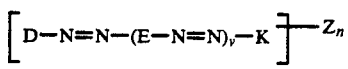
(4f)

in which

Z is bound to D or to K or, in the case where n is 2, one Z is bound to D and the other Z is bound to K, and Z is a radical of the formula

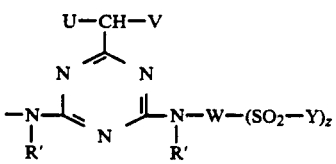

or

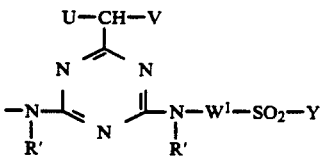

in which each R', being identical to or different from one another, is methyl, ethyl or hydrogen, and $W^1$ is alkylene of 2 to 4 carbon atoms or phenylene unsubstituted or substituted by 1 or 2 substituents selected from the group consisting of methyl, methoxy, ethoxy and chlorine, or is a group of the formula —(CH$_2$)$_w$—phenylene— in which w is the number 1,2,3 or 4 and phenylene is 1,3- or 1,4-phenylene, and

D is the radical of a diazo component to which optionally an azo radical is bound, E is the bivalent radical of a couplable and diazotizable compound, K is the radical of a coupling component to which optionally azo radical is bound, and v is the number 0 or 1.

4. A dye as claimed in claim 1 of the formula

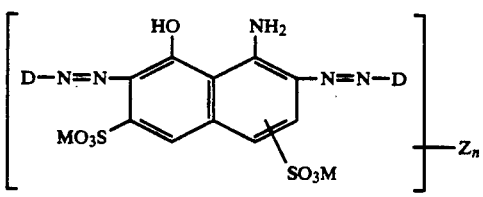

in which

Z is bound to D, and both Z in the case where n is 2 are not bound simultaneously to the same D, and Z is a group of the formula

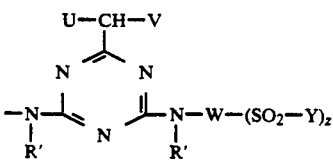

or

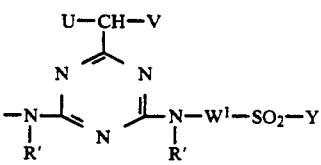

in which each R', being identical to or different from one another, is methyl, ethyl or hydrogen, and $W^1$ is alkylene of 2 to 4 carbon atoms or phenylene unsubstituted or substituted by 1 to 2 substituents selected from the group consisting of methyl, methoxy, ethoxy and chlorine, or is a group of the formula —(CH$_2$)$_w$—phenylene— in which w is the number 1, 2, 3 or 4 and phenylene is 1,3- or 1,4-phenylene.

D is each, identical to or different from one another, the radical of a diazo component to which optionally an azo radical is bound, and M is hydrogen or an alkali metal.

5. A dye as claimed in claim 1 of the formula

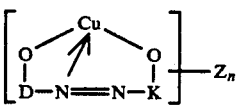

in which

Z is bound to D or to K or, in the case where n is 2, one Z is bound to D and the other Z is bound to K, and Z is a group of the formula

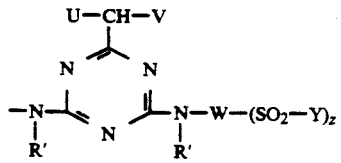

or

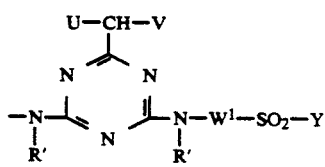

in which each R', being identical to or different from one another, is methyl, ethyl or hydrogen, and $W^1$ is alkylene of 2 to 4 carbon atoms or phenylene unsubstituted or substituted by 1 to 2 substituents selected from the group consisting of methyl, methoxy, ethoxy and chlorine, or is a group of the formula $$-(CH_2)_w-phenylene-$$

in which w is the number 1, 2, 3 or 4 and phenylene is 1,3- or 1,4-phenylene,

D is a radical of a diazo component to which optionally an azo radical is bound, and K is the radical of a coupling component to which optionally an azo radical is bound.

6. A dye as claimed in claim 1, wherein $R^x$ is hydrogen.

7. A dye as claimed in claim 1, wherein n is the number 1.

8. A dye as claimed in claim 1, wherein U is hydrogen, acetyl, ethoxycarbonyl or methoxycarbonyl.

9. A dye as claimed in claim 1, wherein U is hydrogen.

10. A dye as claimed in claim 1, wherein V is cyano, acetyl, methoxycarbonyl or ethoxycarbonyl.

11. A dye as claimed in claim 1, wherein V is ethoxycarbonyl or methoxycarbonyl.

* * * * *

UNITED STATES PATENT AND TRADEMARK OFFICE
CERTIFICATE OF CORRECTION

PATENT NO. : 5,280,110
DATED : January 18, 1994
INVENTOR(S) : Dannheim et al

It is certified that error appears in the above-indentified patent and that said Letters Patent is hereby corrected as shown below:

Column 45, line 68, the word "substituted" (first occurrence) should be --unsubstituted--.
Column 46, line 54, the words "to 2 alkyls" should be --or 2 alkyls--.
Column 48, line 6, the words "optionally azo" should be --optionally an azo--.
Column 48, line 51, the word "1,4-phenylene." should be --1,4-phenylene,--.
Column 50, line 8, the words "D is a radical of" should be --D is the radical of--.

Signed and Sealed this

Ninth Day of August, 1994

Attest:

BRUCE LEHMAN

*Attesting Officer*          *Commissioner of Patents and Trademarks*